US012140659B2

(12) United States Patent
Kalkunte et al.

(10) Patent No.: US 12,140,659 B2
(45) Date of Patent: Nov. 12, 2024

(54) EDGE DEVICE AND METHOD FOR SENSOR-ASSISTED BEAMFORMING

(71) Applicant: PELTBEAM INC., Sherman Oaks, CA (US)

(72) Inventors: Venkat Kalkunte, Saratoga, CA (US); Mehdi Hatamian, Mission Viejo, CA (US); Arman Rofougaran, Newport Coast, CA (US); Puya Rofougaran, Irvine, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 18/677,714

(22) Filed: May 29, 2024

(65) Prior Publication Data

US 2024/0319358 A1 Sep. 26, 2024

Related U.S. Application Data

(63) Continuation of application No. 17/644,750, filed on Dec. 16, 2021, which is a continuation-in-part of application No. 17/444,219, filed on Aug. 2, 2021, now Pat. No. 11,275,147.

(51) Int. Cl.
*G01S 13/66* (2006.01)
*H04W 16/28* (2009.01)

(52) U.S. Cl.
CPC ............ *G01S 13/66* (2013.01); *H04W 16/28* (2013.01)

(58) Field of Classification Search
CPC ................................ G01S 13/66; H04W 16/28
See application file for complete search history.

(56) References Cited

U.S. PATENT DOCUMENTS

| 11,191,013 | B1* | 11/2021 | Kalkunte | H04W 64/003 |
| 2020/0351882 | A1* | 11/2020 | Furuichi | H04W 16/28 |
| 2021/0036752 | A1* | 2/2021 | Tofighbakhsh | H04B 7/0695 |
| 2021/0058826 | A1* | 2/2021 | Mao | H04W 28/088 |
| 2021/0099890 | A1* | 4/2021 | Imanilov | H04W 16/28 |
| 2021/0119962 | A1* | 4/2021 | Ramia | H04L 61/4511 |
| 2021/0159946 | A1* | 5/2021 | Raghavan | H01Q 21/24 |
| 2021/0243821 | A1* | 8/2021 | Palamara | H04W 76/12 |
| 2021/0297410 | A1* | 9/2021 | Zhou | H04W 12/06 |
| 2021/0337452 | A1* | 10/2021 | Furuichi | H04W 36/22 |

OTHER PUBLICATIONS

Notice of Allowance of U.S. Appl. No. 17/661,037 dated Sep. 16, 2024.

* cited by examiner

*Primary Examiner* — Ankur Jain
(74) *Attorney, Agent, or Firm* — CHIP LAW FIRM

(57) ABSTRACT

An edge device includes an antenna array and a sensor that senses a surrounding area of the edge device. The edge device further includes control circuitry that detects a first user in the surrounding area of the edge device sensed by the sensor, tracks the detected first user in the surrounding area of the edge device based on the sensor, controls the first antenna array to direct a first beam of radio frequency (RF) signal in a first direction of the tracked first user, detects and tracks a second user concurrently with the first user in the surrounding area of the first edge device based on the sensor, and updates the control of the first antenna array to direct a second beam of RF signal in a second direction towards the second user concomitant to the directed first beam of RF signal in the first direction towards the first user.

20 Claims, 10 Drawing Sheets

EDGE DEVICE AND METHOD FOR SENSOR-ASSISTED BEAMFORMING

CROSS-REFERENCE TO RELATED APPLICATIONS/INCORPORATION BY REFERENCE

This Patent Application makes reference to, claims priority to, claims the benefit of and is a Continuation Application of U.S. patent application Ser. No. 17/644,750, filed on Dec. 16, 2021, which is a Continuation-in-part Application of U.S. Pat. No. 11,275,147, issued on Mar. 15, 2022.

This application further makes reference to U.S. application Ser. No. 17/341,978, filed on Jun. 8, 2021.

Each of the above reference applications is hereby incorporated herein by reference in its entirety.

FIELD OF TECHNOLOGY

Certain embodiments of the disclosure relate to wireless communication. More specifically, certain embodiments of the disclosure relate to an edge device and a method for sensor-assisted beamforming for accelerating user equipment (UE) specific beamforming.

BACKGROUND

Wireless telecommunication in modern times has witnessed the advent of various signal transmission techniques and methods, such as beamforming and beam steering techniques, for enhancing the capacity of radio channels. Latency and the high volume of data processing are considered prominent issues with next-generation networks, such as 5G. Currently, the use of edge computing in the next generation networks, such as 5G and upcoming 6G, is an active area of research, and many benefits have been proposed, for example, faster communication between vehicles, pedestrians, and infrastructure and other communication devices. For example, it is proposed that proximity of conventional edge devices to user equipment (UEs) may likely reduce the response delay usually suffered by UEs while accessing the traditional cloud. However, there are many open technical challenges for successful and practical use of edge computing in modern networks, especially in 5G or the upcoming 6G environment.

In a first example, one major technical challenge of the mmWave beamforming is signal attenuation, which adversely impacts low latency and high data rate requirements. For example, generally, mmWave signals may be easily blocked by atmospheric conditions such as rain or is absorbed by oxygen, which is one reason why it only works at short ranges. Unlike traditional antennas that broadcast in every direction, so other communication devices can wirelessly connect with them, 5G-enabled antennas do not broadcast but points a beam at one object and may make an individual connection to one or more objects. This increases the complexity of antennas in user equipment (UE), base stations, and other network nodes (e.g., repeater devices, small cell, etc.) as antennas are required to be designed to handle the complexity of aiming a beam at a target object in a crowded cellular environment with plenty of obstructions. Current positioning methods used to determine a geographical location of a target device, such as a UE, are coarse (having more than 3 to 10 meters error) and add to the ever-increasing signaling load among various network nodes to estimate position. For example, in 3GPP release 16, it is planned to achieve less than 3 meters positioning accuracy for some use cases. In certain scenarios, the complexity increases manifold when the target object is in motion and its location changes rapidly. Thus, in such scenarios, faster decisions to alter the beam become necessary to ensure the best performance. Moreover, the performance of UEs varies with the location of the UEs and their proximity to a relay or service side of a conventional repeater. This is because the usual method of wide beam access, although it works in proximity to the conventional repeater device but suffers as a given UE, moves at greater distances from the conventional repeater device, especially for mmWave communication due to signal attenuation.

In a second example, Quality of Experience (QoE) is another open issue, which is a measure of a user's holistic satisfaction level with a service provider (e.g., Internet access, phone call, or other carrier network-enabled services). The challenge is how to ensure seamless connectivity as well as QoE without significantly increasing infrastructure cost, which may be commercially unsustainable with present solutions.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

An edge device and a method for sensor-assisted beamforming for accelerating user equipment (UE) specific beamforming for high performance and reliable communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an edge device and a method for sensor-assisted beamforming. Beneficially, the edge device comprises a sensor that is employed intelligently for accelerating user equipment (UE) specific beamforming for high performance and reliable communication. The edge device has a multi-function capability of sensing, tracking, and beamforming that work in synchronization such that a beam of radio frequency (RF) signal having a signal strength greater than a threshold can be directed towards a direction of a user or a location of the user, where the user is tracked by the sensor even if the user is in motion and change its location rapidly. The disclosed edge device executes sensing, tracking, and beamforming cooperatively in real-time or near real-time that enables making faster and accurate decisions to alter the beams as per need without any increase in signaling load on a cellular network and further ensures the best performance consistently in terms of high throughput data rate as well as ultra-reliable communication as compared to existing systems. Further, the edge device and the method of the present disclosure ensure seamless connectivity as well as QoE while reducing the infrastructure cost due to effective management and concentration of radiation pattern of the beams of RF signals having higher signal strength due to precise sensing, tracking, and beamforming functions that work in cooperation. For instance, existing road-side units (RSU) or repeater devices deployed indoors or outdoors need to be deployed near each other (say X meters apart) to provide coverage in an area due to the issues of signal attenuation in mmWave communication. This is because the usual method of wide beam access, although it works in proximity to the conventional repeater device but suffers as a given UE, moves at greater distances from the conventional repeater device, especially for mmWave communication due to signal attenuation. On the contrary, the use of the disclosed edge device reduces the number of such devices that need to be deployed to provide coverage in the same area by more than 30-50 percent. This is because of the cooperative operation of the sensing, tracking, and beamforming functions that seamless connectivity with higher signal strength is provided to the moving UE by dynamic and accurate directing of the beam of RF signal in a specific radiation pattern towards the users (i.e., people) tracked by the sensor. In the following description, reference is made to the accompanying drawings, which form a part hereof, and in which is shown, by way of illustration, various embodiments of the present disclosure.

Figure 1:
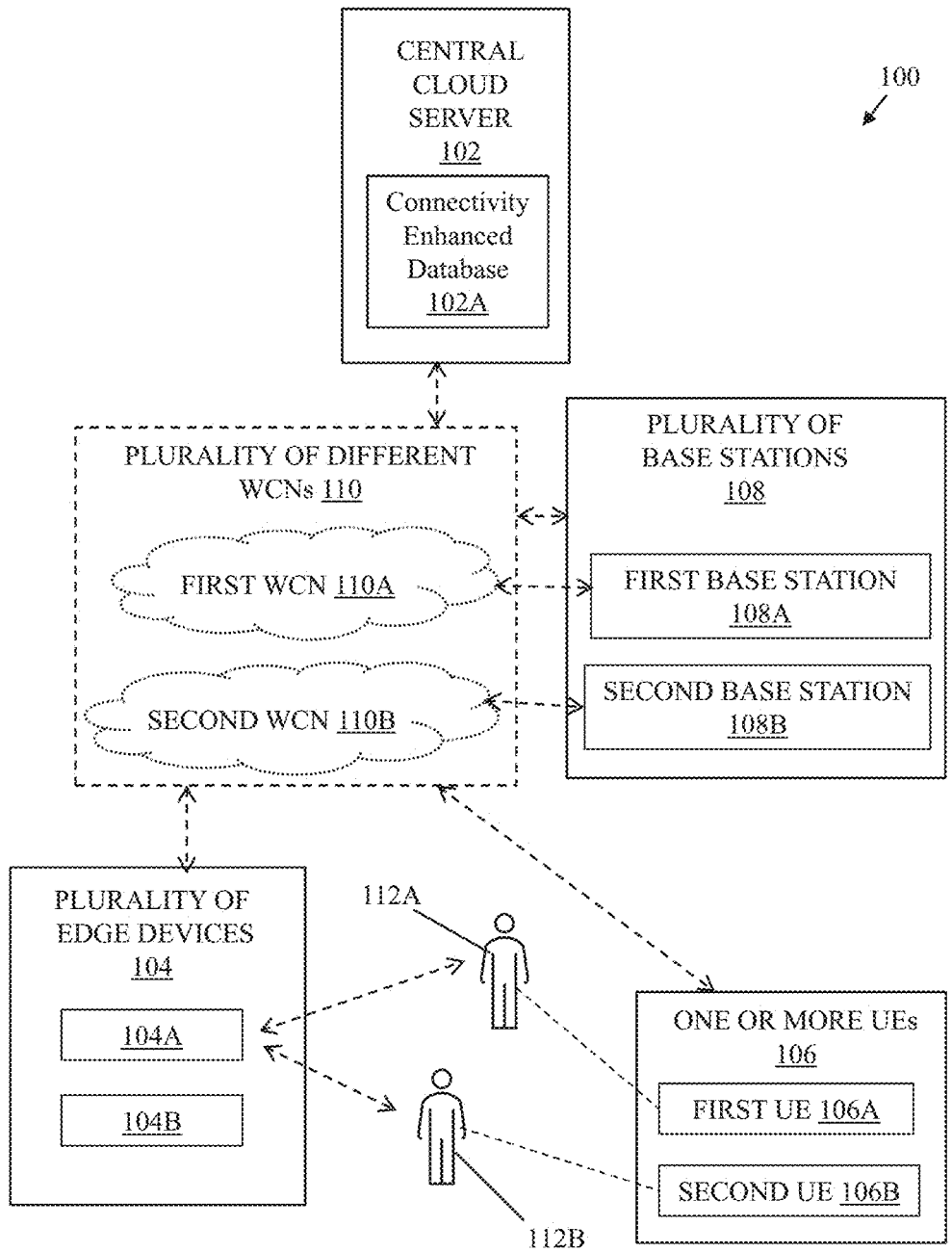
FIG. 1 is a network environment diagram illustrating various components of an exemplary communication system with a central cloud server and a plurality of edge devices for sensor-assisted beamforming, in accordance with an exemplary embodiment of the disclosure.

FIG. 1 is a network environment diagram illustrating various components of an exemplary communication system with a central cloud server and a plurality of edge devices, in accordance with an exemplary embodiment of the disclosure. With reference to FIG. 1, there is shown a block diagram 100 of a network environment that includes a central cloud server 102, a plurality of edge devices 104, one or more user equipment (UEs) 106, and a plurality of base stations 108. There is further shown a plurality of different WCNs 110, such as a first WCN 110A of a first service provider and a second WCN 110B of a second service provider. There is also shown a first user 112A and a second user 112B.

The central cloud server 102 includes suitable logic, circuitry, and interfaces that may be configured to communicate with the plurality of edge devices 104, the one or more UEs 106, and the plurality of base stations 108. In an example, the central cloud server 102 may be a remote management server that is managed by a third party different from the service providers associated with the plurality of different WCNs 110. In another example, the central cloud server 102 may be a remote management server or a data center that is managed by a third party, or jointly managed, or managed in coordination and association with one or more of the plurality of different WCNs 110. In an implementation, the central cloud server 102 may be a master cloud server or a master machine that is a part of a data center that controls an array of other cloud servers communicatively coupled to it for load balancing, running customized applications, and efficient data management. The connectivity enhanced database 102A may be a low-latency database, for example, "DynamoDB," "Scylla," or other proven and known low-latency databases that can handle one or more million transactions per second on a single cloud server. The connectivity enhanced database 102A may be an intelligent and learned database, which specifies wireless connectivity enhanced information for a surrounding area of each of the plurality of edge devices 104 independent of a plurality of different WCN 110 of different service providers. An exemplary training phase to generate the connectivity enhanced database 102A has been provided and explained in detail in the U.S. application Ser. No. 17/341,978, filed on Jun. 8, 2021.

Each edge device of the plurality of edge devices 104 such as the edge device 104A may be one of an XG-enabled edge communication device, an XG-enabled edge repeater device, an XG-enabled relay device, an XG-enabled customer premise equipment (CPE), an XG-enabled ceiling unit, an XG-enabled small cell, or an XG-enabled road-side unit (RSU), where the term "XG" refers to 5G or 6G communication. In an implementation, each edge device or some of the plurality of edge devices 104 includes suitable logic, circuitry, and interfaces that may be configured to communicate with the central cloud server 102. In such an implementation, the edge device 104A may be controlled out-of-band, for example, in a management plane, by the central cloud server 102. In an implementation, some of the edge devices of the plurality of edge devices 104 may be deployed at a fixed location, while some may be portable. For example, an edge device may be a fixed wireless access (FWA) device, a ceiling unit deployed indoors, a repeater device deployed at a fixed location indoors or outdoors, a small cell, or a CPE or a portable repeater device.

Each of one or more UEs 106, such as a first UE 106A and a second UE 106B, may correspond to telecommunication hardware used by an end-user to facilitate communications. Alternatively stated, each of the one or more UEs 106 may refer to a combination of a mobile equipment and subscriber identity module (SIM). Each of the one or more UEs 106 may be a subscriber of at least one of the plurality of different WCNs 110. Examples of the one or more UEs 106 may include but are not limited to, a smartphone, a vehicle, a virtual reality headset, an augmented reality device, an in-vehicle device, a wireless modem, or any other customized hardware for telecommunication.

Each of the plurality of base stations 108 may be a fixed point of communication that may communicate information, in the form of a plurality of beams of RF signals, to and from communication devices, such as the one or more UEs 106 and the plurality of edge devices 104. Multiple base stations corresponding to one service provider may be geographically positioned to cover specific geographical areas. In an implementation, each of the plurality of base stations 108 may be a gNB. In another implementation, the plurality of base stations 108 may include eNBs, Master eNBs (MeNBs) (for non-standalone mode), and gNBs.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of network infrastructure to provide services to its subscribers over the licensed spectrum, for example, 4G LTE or 5G spectrum (FR1 or FR2). For example, the first base station 108A or the first UE 106A may be controlled, managed, or associated with the first WCN 110A, and the second base station 108B or the second UE 106B may be controlled, managed, or associated with the second WCN 110B different from the first WCN 110A. The plurality of different WCNs 110 may also include mobile virtual network operators (MVNO).

Beneficially, the plurality of edge devices 104, such as the edge device 104A, significantly reduces the issue of signal attenuation, which adversely impacts low latency and high data rate requirements. The edge device 104A includes a sensor that is configured to perform sensing and tracking of a location of a user in motion, such as the first user 112A carrying the first UE 106A, accurately with a centimeter-level accuracy (e.g., less than 5-10 cm error magnitude) instead of a coarse level accuracy in existing systems. Accordingly, a radiation pattern of an antenna array of the edge device 104A may be calibrated to communicate a beam of RF signal in a specific radiation pattern that is most suited for a defined period. In an example, if the first user 112A is moving away from the edge device 104A, a pencil beam may be employed for communication having signal strength greater than the threshold so that both uplink and downlink communication may be maintained (or increase) at the multigigabit data rate. The radiation pattern may be dynamically updated based on the ongoing changes in the location or position of the first user 112A carrying the first UE 106A as it moves for consistent high-performance and ultra-reliable communication. As the beam of RF signal is in a concentrated or targeted form and directed precisely on the ongoing tracked location of the first user 112A, mmWave communication occurs at extended ranges than usual short ranges and the range and radiation pattern can be changed dynamically as per the tracked location of the first user 112A. Furthermore, the antenna array (e.g., a first antenna array 210A of FIG. 2A) of the edge device 104A is designed and configured to operate in cooperation with the sensor to reduce the complexity of aiming a beam at a target object in a crowded cellular environment with plenty of obstructions, without increasing any signaling load among various network nodes. The edge device 104A makes intelligent use of its sensor to sense and track one or more users, such as the first user 112A and the second user 112B (i.e., senses and tracks people who may carry corresponding UEs) precisely instead of a UE alone (such as first UE 106A or the second UE 106B), which is then used for directing one or more beams in the direction of the tracked one or more user, such as the first user 112A and the second user 112B to reach their locations. In other words, the standard UE position estimation methods in 4G LTE and 5G NR are time-consuming and involve multiple signaling over the cellular network, for example, as specified in 3GPP specifications release 16. The disclosed edge device may be a repeater device that not only extends the range and coverage of a base station or a small cell but also reduces latency and enables quick change of beams and radiation patterns to maintain consistent connectivity with the one or more UE carried by one or more users based on sensing and tracking of the one or more users. Thus, the edge device 104A ensures faster decisions due to sensor-assisted beamforming function to alter the beam direction, angle, and shape dynamically and rapidly to ensure the best performance and QoE by providing seamless connectivity without increasing infrastructure cost. Furthermore, the use of sensor in beamforming further reduces (i.e., optimizes) the power usage of the edge device 104A, which may be otherwise employed for over the network signaling as in standard UE position estimation methods known in the art.

In an implementation, the edge device 104A may be connected to the central cloud server 102. In such an implementation, beneficially, the plurality of edge devices 104 further improves coverage in 5G NR cellular network deployments without any adverse user experience to meet QoS for 5G NR communication. Moreover, the central cloud server 102 and the plurality of edge devices 104 exhibit a decentralized model that not only brings cloud computing capabilities closer to UEs to reduce latency but also manifests several known benefits for various service providers associated with the plurality of different WCNs 110. For example, backhaul traffic is reduced by provisioning content at the edge, computational resources are distributed geographically in different locations (e.g., on-premises mini cloud, central offices, customer premises, etc.,) depending on the use case requirements and reliability of a network is improved by distributing content between edge devices and the centralized cloud server 102. Apart from these and other known benefits (or inherent properties) of edge computing, the central cloud server 102 and the plurality of edge devices 104 improve and solve many open issues related to the convergence of edge computing and modern wireless networks, such as 5G or upcoming 6G. The central cloud server 102 significantly improves the beam management mechanism of 5G new radio (NR), true 5G, and creates a platform for upcoming beyond 5G and 6G communications, to achieve low latency and high data rate requirements.

Figure 2A:
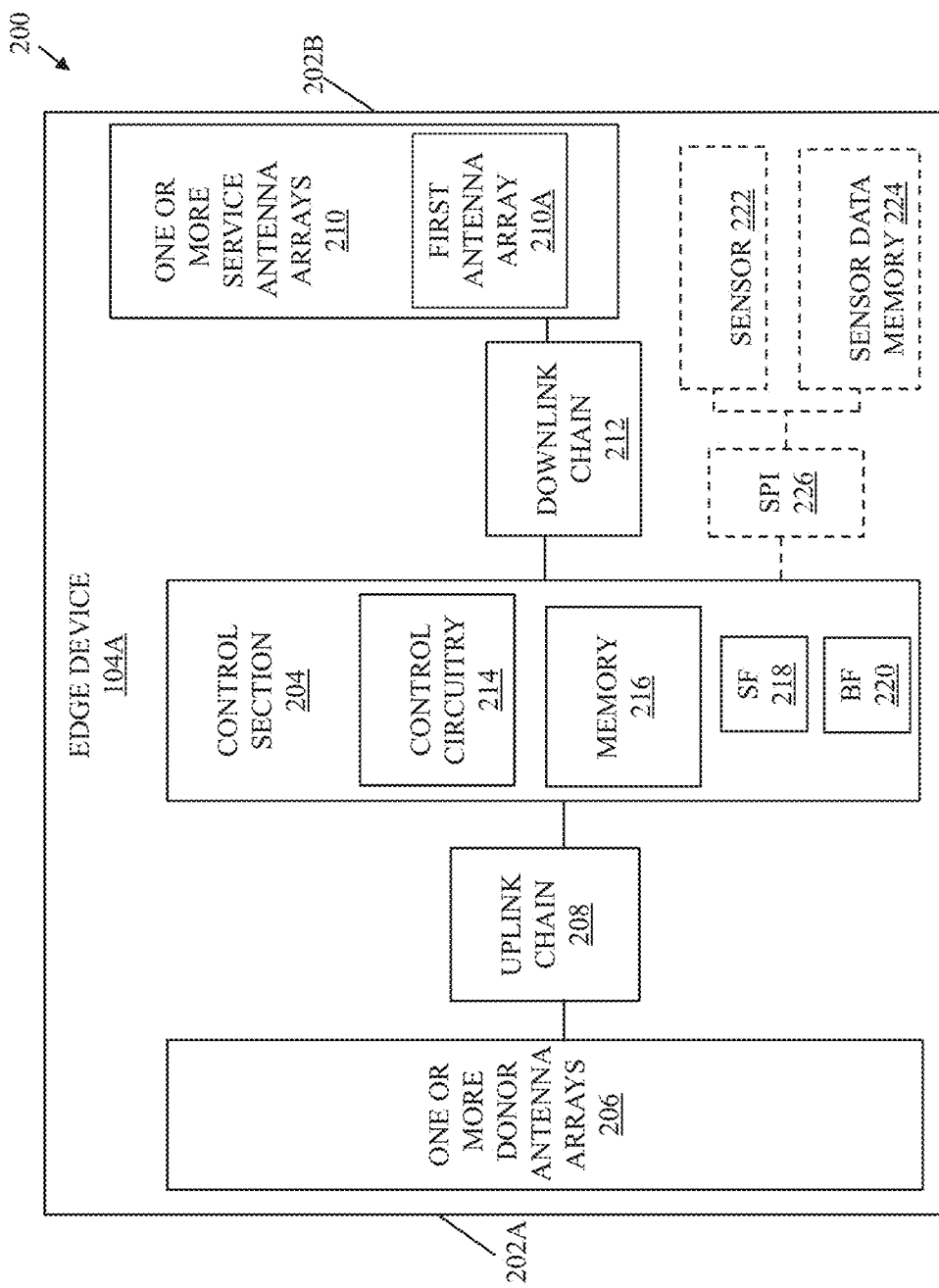
FIG. 2A is a block diagram illustrating different components of an exemplary edge device for sensor-assisted beamforming, in accordance with an embodiment of the disclosure.

FIG. 2A is a block diagram illustrating different components of an exemplary edge device, in accordance with an embodiment of the disclosure. FIG. 2A is explained in conjunction with elements from FIG. 1. With reference to FIG. 2A, there is shown a block diagram 200 of the edge device 104A with various components. The edge device 104A is one of the plurality of edge devices 104 (FIG. 1). The edge device 104A has a donor side 202A facing towards the plurality of base stations 108, such as the first base station 108A and the second base station 108B (of FIG. 1). The edge device 104A also has a service side 202B facing towards one or more users (e.g., the first user 112A) who may be carrying the one or more UEs 106 (e.g., the first UE 106A). In an implementation, the edge device 104A may include a control section 204 and a front-end radio frequency (RF) section, which may include one or more donor antenna arrays 206 and an uplink chain 208 at the donor side 202A, and further one or more service antenna arrays 210 and a downlink chain 212 at the service side 202B. The control section 204 may be communicatively coupled to the front-end RF section, such as the one or more donor antenna arrays 206, the uplink chain 208, the one or more service antenna arrays 210, and the downlink chain 212. The front-end RF section supports millimeter-wave (mmWave) communication as well communication at a sub 6 gigahertz (GHz) frequency. The control section 204 may further include control circuitry 214 and a memory 216. There is further shown a sensing function (SF) 218 and a beamforming function (BF) 220. In some implementation, the edge device 104A may further include a sensor 222 and a sensor data memory 224 that are communicatively coupled to the control circuitry via a Serial Peripheral Interface (SPI) 226. In some implementations, a separate sensor, such as the sensor 222 and the sensor data memory 224, may not be provided, and a portion of a service antenna array, such as the first antenna array 210A, of the one or more service antenna arrays 210 may be configured for sensing a surrounding area of the edge device 104A.

The edge device 104A includes suitable logic, circuitry, and interfaces that may be configured to communicate with one or more base stations of the plurality of base stations 108, one or more UEs 106, and the central cloud server 102. The edge device 104A may be further configured to communicate with the one or more UEs 106 and other edge devices of the plurality of edge devices 104. In accordance with an embodiment, the edge device 104A may support multiple and a wide range of frequency spectrum, for example, 3G, 4G, 5G, and 6G (including out-of-band frequencies). The edge device 104A may be at least one of an XG-enabled repeater device, an XG-enabled ceiling unit, an XG-enabled small cell, an XG-enabled road-side unit (RSU), an XG-enabled relay device, an XG-enabled vehicle-mounted edge device, where the term "XG" refers to 5G or 6G radio communication. Other examples of the edge device 104A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof deployed at a fixed location.

The one or more donor antenna arrays 206 may be provided at the donor side 202A of the edge device 104A and may be communicatively coupled to an uplink chain 208. The one or more service antenna arrays 210 may be provided at the service side 202B and may be communicatively coupled to the downlink chain 212. Each of the uplink chain 208 and the downlink chain 212 may include a transceiver chain, for example, a cascading receiver chain and a cascading transmitter chain, each of which comprises various components for baseband signal processing or digital signal processing. For example, the cascading receiver chain has various components, such as a set of low noise amplifiers (LNA), a set of receiver front end phase shifters, and a set of power combiners, for the signal reception (not shown here for brevity). Similarly, the cascading transmitter chain comprises various components for baseband signal processing or digital signal processing, such as a set of power dividers, a set of phase shifters, a set of power amplifiers (PA).

In an implementation, the one or more service antenna arrays 210 at the service side 202B may be configured to execute mmWave communication with the one or more UEs 106 within its communication range. In an implementation, the one or more service antenna arrays 210 also supports multiple-input multiple-output (MIMO) operations and may be configured to execute MIMO communication with the one or more UEs 106 within its communication range. The MIMO communication may be executed at a sub 6 gigahertz (GHz) frequency or at mmWave frequency for 5G NR communication. Each of the one or more donor antenna arrays 206 and the one or more service antenna arrays 210 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but are not limited to, a linear phased array antenna, a planar phased array antenna, a frequency scanning phased array antenna, a dynamic phased array antenna, and a passive phased array antenna.

The control circuitry 214 may be communicatively coupled to the memory 216 and the front-end RF section. The control circuitry 214 may be configured to execute various operations of the edge device 104A. The control circuitry 214 may be configured to control various components of the front-end RF section, such as the one or more donor antenna arrays 206 and the uplink chain 208 at the donor side 202A; and the one or more service antenna arrays 210 and the downlink chain 212 at the service side 202B. The edge device 104A may be a programmable device, where the control circuitry 214 may execute instructions stored in the memory 216. Examples of the implementation of the control circuitry 214 may include but are not limited to an embedded processor, a baseband processor, a Field Programmable Gate Array (FPGA), a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 216 may be configured to store values calculated by the control circuitry 214. Examples of the implementation of the memory 216 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the control section 204 may further include one or more other components, such as an analog to digital converter (ADC), a digital to analog (DAC) converter, a cellular modem, and the like, known in the art, which are omitted for brevity.

In an implementation, the sensing function 218 may be a function, such as a feature, which, when activated, the sensing of objects in the surrounding area of the edge device 104A is initiated. In an example, the sensing function 218 may be implemented as a sensing circuit that may be activated and deactivated. For example, when deactivated, the edge device 104A may be in a power-saving mode.

In an implementation, the beamforming function 220 may be a function, such as a feature, used to execute beamforming to direct one or more beams of RF signals to one or more target objects in the surrounding area in one or more specific radiation patterns. In an example, the beamforming function 220 may be activated and deactivated. For example, when deactivated, the edge device 104A may be in a power-saving mode.

In operation, the sensor 222 may be configured to sense a surrounding area of the edge device 104A. In an implementation, the control circuitry 214 may be configured to activate the sensing function 218 to sense the surrounding area of the edge device 104A. The edge device 104A may be deployed indoors or outdoors. The sensing of the surrounding area may be done to determine what objects are present in the surrounding area of the edge device 104A around the deployed location of the edge device 104A.

In accordance with an embodiment, the sensor 222 may be a sensing Radar (e.g., a Frequency-Modulated Continuous Wave (FMCW) radar), an image sensing device, a combination of the sensing Radar and the image sensing device, or an object detection sensor. The edge device 104A may be a multi-function edge device that comprises the sensor 222 communicatively coupled to the control circuitry 214, and where the sensing function 218 may be activated in the sensor 222 to sense the surrounding area of the edge device 104A. Other examples of the sensor 222 may include, but may not be limited to, a Lidar or other mmWave sensors. The sensor 222 may be a separate sensor provided and integrated with the edge device 104A. The sensed data of the surrounding area of the edge device 104A may be stored at the sensor data memory 224. The sensor 222 may be communicatively coupled to the control circuitry 214 via the SPI 226. The SPI 226 may be a full-duplex bus interface used to send data between the control section 204 (e.g., a microcontroller or DSP, such as the control circuitry 214) and other peripheral components such as the sensor 222 and a modem, for example, a 5G modem. The SPI 226 supports very high speeds and throughput and is suitable for handling a huge amount of data. In an example, the sensor 222 may be a mmWave sensor that manifests high sensitivity to motion, insensitivity to weather and low light, ability to operate at high velocity, and high-range resolution. For example, scene parameters of the sensor 222 may include a range resolution of about 4.4 centimeters (i.e., provides centimeter-level accuracy), maximum unambiguous range of about 9 meters, a maximum radial velocity of about 1 meter/sec, a radial velocity resolution of 0.12 meters/sec, and an azimuth resolution of about 14.5 degrees. It is to be understood that such scene parameters are for an exemplary implementation and may vary depending on other implementations; for example, the maximum unambiguous range may be more than 9 meters, such as 9-30 meters, and the like, without limiting the scope of the disclosure.

In a case where the sensor 222 is the sensing Radar or the object detection sensor, the sensing may be executed by communicating a radio frequency (RF) wave that hits the surrounding objects of the edge device 104A and detects the energy that is reflected from such objects. The RF wave may be in mmWave signal frequency or an out-of-band frequency that is different from the frequency used to communicate data streams in the cellular network of the plurality of different WCNs 110. In an implementation, the RF wave may be a chirp signal with a starting frequency in the mmWave frequency range. The chirp signal may have a plurality of chirp parameters. In an example, the plurality of chirp parameters may include a start frequency of about 60 Gigahertz (GHz), a slope of about 70 Megahertz per unit sample (MHz/us), samples per chirp of about 256 samples, chirps per frame of about 32, a sampling rate of about 5.2 mega samples per second (Msps), sweep bandwidth of about 3.44 GHz, and frame periodicity of about 250 milliseconds (msec). In a case where the sensor 222 is the image sensing device, such as a camera, an infrared sensor, time-of-flight camera (ToF camera), a view of the surrounding area of the edge device 104A may be captured. In a case where the sensor 222 is the combination of the sensing Radar and the image sensing device, the use of RF wave along with captured view from the image sensing device may complement each other for object detection and identification in a faster and accurate manner. In some cases, other types of sensors, such as other object detection sensors, to sense the surrounding environment may be used. For example, ultrasonic sensors may be used to send a burst of sound waves towards surrounding objects, and which may reflect sound waves back to the sensor 222, which then may be used to determine the distance of one or more objects from the edge device 104A in the surrounding area and thus become aware of the location of the one or more objects in the surrounding area.

In accordance with an embodiment, the sensing of the surrounding area of the edge device 104A is executed in a first frequency by the sensor 222 that is different from a second frequency used to direct the first beam of RF signal from the first antenna array 210A. In other words, the communication of the RF wave for sensing purposes may be done in the first frequency, for example, an out-of-band frequency, which is different from the frequency (e.g., an in-band frequency) of the first beam of RF signal that carries data steam to the first UE 106A. The use of mutually isolated frequencies is employed to avoid any unwanted signal interference and signal attenuation. In one implementation, the sensing may be processed by the same RF and base-band processor (such as the control circuitry 214), which executes the beamforming. In another implementation, the sensing and the beamforming operations only share the baseband processor or only RF circuits. In yet another implementation, each of the sensing function 218 (i.e., sensing of the surrounding area) and the beamforming function 220 (to execute beamforming) has its own radio and own baseband processor (i.e., a separate baseband processor or separate control circuitry).

In accordance with an embodiment, the control circuitry 214 may be further configured to generate a three-dimensional (3D) environment representation of the surrounding area of the edge device 104A. In an example, the 3D environmental representation may be generated in the form of a point cloud. The 3D environment representation may be generated based on the sensing of the surrounding area of the edge device 104A. The 3D environmental representation may be a representation of a surrounding environment of the edge device 104A that indicates a plurality of mobile and stationary objects surrounding the edge device 104A. For example, the 3D environmental representation may indicate any possibility of signal blockages or fading, road condition, traffic information, and current weather condition.

The control circuitry 214 may be configured to detect the first user 112A in the surrounding area of the edge device 104A sensed by the sensor 222. One or more users, such as the first user 112A, may be detected in the surrounding area based on the sensing executed by the sensor 222. In an example, the control circuitry 214 may be further configured to detect an object as a human user by detecting a contour of the object, for example, one or more different contour or shapes of a human being may be used to detect a human user, which is less-computational resource intensive process of detecting a human user. The first user 112A may be carrying one or more UEs, such as the first UE 106A.

In another example, the control circuitry 214 may be further configured to detect one or more objects by use of one or more object detection and identification algorithms. In an implementation, the one or more object detection and identification algorithms may be custom designed for selected objects, for example, buildings, corners of buildings, street cross-sections, street corners and turns, human user, vehicle, types of vehicle, like two-wheeler, three-wheeler, or four-wheeler etc. The objects that are relevant and needs to be detected and tracked may be determined and the control circuitry 214 may employ unique characteristic features associated with each of those objects to detect and identify those objects. The detection and identification of all objects may not be required. Only the objects that may influence the radio frequency (RF) wave reflection, signal obstruction, or connectivity to the one or more UEs if present in the surrounding area of the edge device 104A, may be selected exclusively for object detection and identification. In yet another example, the control circuitry 214 may be further configured to detect one or more objects by use of one or more object detection and identification known in the art.

The control circuitry 214 may be further configured to track the detected first user 112A in the surrounding area of the edge device 104A based on the sensor 222. Irrespective of a type of the sensor 222 used, i.e., whether the sensor 222 is the sensing radar, the image sensing device, the object detection sensor, or their combination, the control circuitry 214 uses sensed information by the sensor 222 to track the detected first user 112A in the surrounding area of the edge device 104A. A current location and any movement and corresponding changes in the location coordinates or position of the detected first user 112A may be tracked.

In accordance with an embodiment, the control circuitry 214 may be further configured to track a location of the first UE 106A in motion from the edge device 104A. Based on the continuous sensing, the control circuitry 214 may track the location of the first UE 106A in motion from the edge device 104A. Such tracking may be a local tracking using the communicated RF wave emitted by the edge device 104A that detects the first UE 106A in terms of a current distance and a current angle from the edge device 104A. As the location coordinates of the edge device 104A are known, the location coordinates of the first UE 106A may be derived without increasing any signaling load on the network. In a case where the communicated RF wave is emitted in a mmWave frequency, the accuracy of tracking is increased due to the high sensitivity of the mmWave frequency to motion. Moreover, the tracking is insensitive to low light or weather and manifest a centimeter-level accuracy in the tracking of the location of the first UE 106A. In some implementations, the tracking of the location of the first UE 106A in motion may be further enhanced by correlating the tracking information with the generated 3D environment representation of the surrounding area of the edge device 104A or the input from the image sensing device when employed.

The control circuitry 214 may be further configured to control the first antenna array 210A to direct a first beam of radio frequency (RF) signal having a signal strength greater than a first threshold in a first direction of the first user 112A being tracked based on the sensor 222. The control circuitry 214 may be further configured to execute beamforming to direct the first beam of RF signal having the signal strength greater than the threshold towards the first user 112A who's location may be tracked. It is comparatively low-computational resource intensive task to track a bigger object like the first user 112A than a much smaller object, like a smartphone, such as the first UE 106A. Moreover, as the first user 112A may be carrying the first UE 106A, the first UE 106A and the first user 112A may be considered co-located for beamforming purposes. This simplifies the beamforming to direct the first beam of RF signal concentrated towards the direction of the first user 112A to reach the first user 112A. In other words, the first beam of RF signal directed towards the first user 112A also illuminates the first UE 106A to enable RF communication, for example, in 5G NR frequencies (either sub-6 GHz or mmWave frequencies). The edge device 104A may be a 5G-enabled repeater device that increases the coverage of a 5G-enabled RAN node, such as a gNB or a 5G-enabled small cell, and allows the first UE 106A to attach to the 5G-enabled RAN node through itself (i.e., through the edge device 104A), where the first antenna array 210A is controlled to direct the first beam of RF signal having a signal strength greater than the first threshold (i.e. a SNR or signal quality sufficient to establish communication in multigigabit throughput). In an example, a signal strength sufficient to decode a primary synchronization signal (PSS) at the first UE 106A may be considered as a sufficiently good signal quality to establish communication between a source node (e.g., gNB or a 5G-enabled small cell) and a destination node, i.e., the first UE 106A, via the edge device 104A. The first UE 106A may be at a distance or a location which may be not suited for RF communication directly by the source node (e.g., the gNB or the small cell), for example, may suffer from signal attenuation. The sensing and beamforming may be cooperatively executed in real-time or near real-time for faster and accurate decisions to alter the beams of RF signals as per need without any increase in signaling load on a cellular network, such as the first WCN 110A or the second WCN 110B as compared to existing systems.

In an implementation, the control circuitry 214 may be further configured to track the location of the detected first user 112A in the surrounding area of the edge device 104A based on the sensor 222 and control the first antenna array 210A to direct a first beam of radio frequency (RF) signal at the location of the first user 112A being tracked based on the sensor 222. The beamforming function 220 may be a function, such as a feature, which, when activated, the first antenna array 210A directs one or more beams of RF signals to one or more target objects in the surrounding area in one or more specific radiation patterns. In some implementations, the generated 3D environment representation may be further used as a reference in the beamforming. For example, the generated 3D environment representation may provide a reference to correlate the tracked location of the moving object, i.e., the first user 112A along with the first UE 106A, with a set of the point cloud that belongs to the same moving object. This correlation further increases the tracking efficiency where the changing location of the first user 112A or the first UE 106A can be tracked with improved accuracy. Accordingly, the radiation pattern of the first antenna array 210A may be calibrated to communicate the first beam of RF signal in a specific beam shape that is most suited for a defined period, for example, for next "X" seconds, where "X" is a positive integer, such as 5 sec, 10 sec, 15 sec, etc. In an example, if the first user 112A along with the first UE 106A is moving away from the edge device 104A, a pencil beam or a narrow beam may be employed for communication of the first beam of RF signal with the signal strength greater than the threshold so that both uplink and downlink communication may be maintained (or increase) at the multigigabit data rate. The radiation pattern may be dynamically updated based on the changes in the location of the first user 112A co-located with the first UE 106A. For example, if the first user 112A moves nearby (e.g., 10-30 meters) to the edge device 104A, then a broad beam may be radiated by the first antenna array 210A. Such concentration of the beam of RF signal having increased signal strength may be executed to enable the first UE 106A to receive services of consistent high-performance and ultra-reliable communication.

In accordance with an embodiment, the control of the first antenna array 210A to direct the first beam of RF signal may comprise selecting a first radiation pattern (e.g., a narrow or a pencil beam) from a plurality of radiation patterns based on a distance of the first user 112A from the edge device 104A. The first radiation pattern may be associated with a first communication range with respect to the edge device 104A. The control of the first antenna array 210A to direct the first beam of RF signal comprises executing beamforming in the first radiation pattern selected from the plurality of radiation patterns to make the directed first beam of RF signal reach to the first user 112A that is within the first communication range.

In accordance with an embodiment, the control of the first antenna array 210A to direct the first beam of RF signal comprises updating the beamforming to a second radiation pattern (e.g., a broad beam or a flower shaped beam) from the first radiation pattern to make the directed first beam of RF signal reach to the first user 112A. The second radiation pattern is associated with a second communication range (e.g., 10-30 meters around the edge device 104A in an example, i.e., nearby the edge device 104A) with respect to the edge device 104A. The beamforming may be updated to the second radiation pattern having the signal strength greater than a second threshold when the first user 112A moves to the second communication range from the first communication range. For example, a lower number of antenna elements of the first antenna array 210A may be activated in case the first user 112A is within the second communication range (e.g., 10-30 meters around the edge device 104A in an example, i.e., nearby the edge device 104A) as compared to the case when the first user 112A moves beyond the first communication range, such as the second communication range (i.e., moves far away, for example, 31-80 meters or beyond, for example). This dynamic change of radiation pattern thus optimizes power consumption at the edge device 104A meaning more radiation power and a greater number of antenna elements of the first antenna array 210A may be used when needed (e.g., for far-away users) and not by default.

In accordance with an embodiment, the control circuitry 214 may be further configured to detect and track a second user 112B concurrently with the first user 112A in the surrounding area of the edge device 104A based on the sensor 222. The control circuitry 214 is further configured to update the control of the first antenna array 210A such that a second beam of RF signal having the signal strength greater than the first threshold is directed in a second direction towards the second user 112B concomitant to the first beam of RF signal that is directed in the first direction towards the first user 112A.

In accordance with an embodiment, the control circuitry 214 may be further configured to update the control of the first antenna array 210A such that one beam of RF signal in a defined radiation pattern is directed to cover the first user 112A as well as the second user 112B when a first location of the first user 112A is within a threshold range of a second location of the second user 112B. In this case, if both the first user 112A as well as the second user 112B are near to each other (i.e., the first location of the first user 112A is within the threshold range of the second location of the second user 112B), a single beam may be sufficient to illuminate both the users. This intelligent beamforming decision of which radiation pattern to select based on an inter-distance between two users further reduces the power consumption without any compromise on signal quality for RF communication. For example, instead of communicating a user-specific pencil beam, a broad beam may be communicated to cover a group of users. Alternatively, a broad beam may be communicated most of the time, and narrow or pencil beams may be communicated only when one or more users move beyond the communication range of the broad beam, for example, moves to the first communication range from the second communication range.

In accordance with an embodiment, the control circuitry 214 may be further configured to determine location coordinates of a plurality of reflective objects in the surrounding area of the edge device 104A. Thereafter, the control circuitry 214 may be further configured to utilize the determined location coordinates of the plurality of reflective objects to correlate a radiation pattern of the first antenna array 210A to the plurality of reflective objects. Based on the sensing of the surrounding area of the edge device 104A, the control circuitry 214 determines the location coordinates of the plurality of reflective objects that may cause RF signals from the edge device 104A to reflect towards the edge device 104A. Thus, if the location coordinates are known, the radiation pattern of the first beam of RF signal may be further configured to minimize any unwanted signal reflections from the plurality of reflective objects reducing signal noise.

In accordance with an embodiment, the control circuitry 214 may be further configured to determine a distance and an angle of the edge device 104A from each of a plurality of mobile and stationary objects surrounding the edge device 104A. Based on the sensing, once the distance and the angle of the edge device 104A from each of the plurality of mobile objects, including the first user 112A and stationary objects surrounding the edge device 104A, are determined, the radiation pattern of the first beam of RF signal may be further improved in terms of directivity and precision targeting of the highly concentrated first beam of RF signal with increased signal strength.

In accordance with an embodiment, the control circuitry 214 may be further configured to determine local traffic information in real-time or near real-time based on the sensed surrounding area of the edge device 104A. In some implementation, for example, in case of outdoors deployment of the edge device 104A, the control circuitry 214 may be further configured to determine local traffic information in real-time or near real-time based on the sensed surrounding area of the edge device 104A and the generated 3D environment representation of the surrounding area of the edge device 104A. There may be times when traffic information from satellites (or maps) is not accurate as such traffic information depends on the number of users using such software applications running map services. Based on the sensing, a number of objects, such as vehicles, moving in the surrounding area of the edge device 104A may be counted, which in turn indicates traffic information accurately locally around the edge device 104A independent of the use of the Internet-based map services. Furthermore, the correlation of such local traffic information with the generated 3D environment representation further improves the accuracy of the determination of the local traffic information in real-time or near real-time. Such local traffic information determined in real-time or near real-time may be then used to further improve radiation patterns to communicate one or multiple beams of RF signals concurrently for different UEs, such as the first UE 106A and the second UE 106B.

In accordance with an embodiment, the control circuitry 214 may be further configured to communicate an assistance request to the central cloud server 102 when one or more defined service continuity criteria are predicted to be met, to cause the central cloud server 102 to instruct the edge device 104A or another edge device 104B of the plurality of edge devices 104 with specific initial access information to continue servicing one or more UEs 106 carried by the first user 112A. The one or more defined service continuity criteria may be, for example, a value of SNR, a value of RSSI or other signal quality parameter, which may be predicted to deteriorate based on the ongoing changes in the locations of the surrounding objects tracked by the control circuitry 214. The one or more defined service continuity criteria, when predicted to be met in an upcoming time, indicates an upcoming possibility of signal blockage for the currently serviced UEs by the edge device 104A, such as the first UE 106A or the second UE 106B.

For example, the control circuitry 214 may be further configured to predict a start time and an end time of a signal blockage for the first UE 106A in motion being serviced by the edge device 104A from a second moving object based on a track of the second moving object in the surrounding area of the edge device 104A. Dynamic nature of surroundings of the edge device 104A, such as any change in surroundings, have the potential to adversely impact signal propagation, cause signal loss, poor reach, or signal blockage by an object, such as a moving object or a stationary object, in the surroundings. For example, in certain scenarios, there may be temporary signal blockage due to the second moving object that may block signals between the edge device 104A and a base station, such as the first base station 108A or there may be a blockage due to a non-line-of-sight (NLOS) between the first base station 108A and the edge device 104A. In some other scenarios, there may be signal blockage due to the second moving object that may block signals between the edge device 104A and the first UE 106A. Based on the sensing, for example, based on a determination of distance, angle, velocity, and moving direction of the first user 112A carrying the first UE 106A and the second moving object, with respect to the edge device 104A, the control circuitry 214 may predict the start time and the end time of the signal blockage for the first UE 106A in motion much before the signal blockage occurs. Thereafter, the control circuitry 214 may be further configured to communicate an alert of the predicted signal blockage for the first UE 106A to the central cloud server 102 along with the predicted start time and the end time of the signal blockage to cause the central cloud server 102 to instruct another edge device of the plurality of edge devices 104 with specific initial access information to continue servicing the first UE 106A. Alternatively, instead of the central cloud server 102, the control circuitry 214 may be further configured to communicate an alert of the predicted signal blockage for the first UE 106A to another edge device of the plurality of edge devices 104 along with at least the predicted start time of the signal blockage and a specific initial access information to cause the other edge device to continue servicing the first UE 106A. Accordingly, the central cloud server 102 may be configured to select an appropriate edge device, such as the edge device 104B, to communicate wireless connectivity enhanced information, including specific initial access information to the other edge device to bypass the initial access-search on the other edge device. Based on the specific initial access information, the other edge device may quickly switch over to the appropriate base station (e.g., using PCID of the base station and ARFCN) received from the central cloud server 102 to continue servicing the first UE 106A. The specific initial access information may further indicate to select a particular service side beam index, e.g., a beam index #41 out of 0-63 beam indexes in a beam book (stored in the memory 216) and a particular radiation pattern to service the first UE 106A bypassing the initial access search at the other edge device, such as the edge device 104B, where the handover time is much lesser than the standard average mm-wave gNB handover time under same scenarios, such as same cell radius and travelling speed of the first UE 106A.

In accordance with an embodiment, the control circuitry 214 may be further configured to set an offline mode or a connected mode at the edge device 104A. In the connected mode, the control circuitry 214 may be further configured to periodically communicate sensing information to the central cloud server 102 based on the sensed surrounding area of the edge device 104A. The sensing information may comprise two or more of: a distance and an angle of the edge device 104A from each of a plurality of objects surrounding the edge device 104A, a position (e.g., 3D coordinates) of the edge device 104A, a location and a moving direction of a plurality of UEs including the first UE 106A, a time-of-day, local traffic information, local road information, local construction information, a local traffic light information, and local weather information.

In accordance with an embodiment, the control circuitry 214 may be further configured to obtain wireless connectivity enhanced information from the central cloud server 102 based on a position of the edge device 104A in the connected mode. The wireless connectivity enhanced information may include specific initial access information to bypass an initial access-search on the edge device 104A. The wireless connectivity enhanced information provided by the central cloud server 102 for the first UE 106A and the second UE 106B may include selected initial access information to further accelerate UE-specific beamforming for each of the first UE 106A and the second UE 106B and connectivity to one or more base stations, such as the first base station 108A and the second base station 108B, from the edge device 104A bypassing an initial access-search on the edge device 104A. The wireless connectivity enhanced information, including the specific initial access information for the edge device 104A, is extracted from the connectivity enhanced database 102A. The selected initial access information for the first UE 106A and the second UE 106B may indicate the best and/or optimal transmit (Tx) and receive (Rx) beam for the donor side 202A and the best Tx-Rx beam for the service side 202B, best Physical Cell Identities (PCIDs) associated with different service providers, best and/or optimal absolute radio-frequency channel number (ARFCNs), and a signal strength information associated with each of Tx beam and the Rx beam of the edge device 104A. The terms best and/or optimal refers to wireless connectivity using multiple beams of RF signals at both the donor side 202A and service side 202B that has the highest signal strength (or among the top three available signal strengths), for example, for 5G NR signals and data throughput rate higher than one or more specified threshold values, while executing uplink and downlink communication using one or more of the plurality of different WCNs 110. The specific initial access information may indicate which beam index to set at an edge device, such as the edge device 104A, for the uplink communication, a specific Physical Cell Identity (PCID) which indicates which gNB to connect to, or which WCN of the plurality of different WCNs 110 to select, which is the best absolute radio-frequency channel number (ARFCN), which specific beam configuration to set, or whether a connection to the base station is to be established directly or indirectly in an NLOS path using another edge device, such as the edge device 104B, in a network of edge devices depending on the current location of the edge device 104A. The specific initial access information may further indicate which beam index to set at an edge device, such as the edge device 104A for the downlink communication, which WCN to select, which specific beam configuration to set, what power level of the RF signal may be sufficient, or an expected time period to service one or more UEs, such as the first UE 106A, depending on the deployed location of the edge device 104A.

The control circuitry 214 may be further configured to receive a response from the central cloud server 102 that no handover is required for the edge device 104A for one or more of the plurality of UEs based on the communicated sensing information. In a case where a wireless connection (e.g., a cellular connectivity) of a UE that is in motion, such as the first UE 106A, is about to become less than a threshold performance value, such performance drop may be predicted by the central cloud server 102 based on new sensing information received from one or more edge devices in the vicinity of the UE or from the first UE 106A itself. For example, the first UE 106A may be attached to the first base station 108A, and as the first UE 106A moves, the distance from the first base station 108A may increase, and the signal strength may gradually decrease. Thus, based on the new sensing information, such as a moving direction of the first UE 106A, a location of the first UE 106A, distance from one or more edge devices in the vicinity of the first UE 106A, a current weather condition, the location of the reflective objects around the first UE 106A, and an overall 3D environment representation around the first UE 106A, the central cloud server 102 determines that a handover is required to maintain QoE, and accordingly selects a suitable edge device (e.g., the edge device 104A or the edge device 104B) among the plurality of edge devices 104 and communicates wireless connectivity enhanced information to such selected edge device so that there is no need to perform beam sweeping operation or standard initial access search on such edge device. Thus, the first UE 106A may readily connect to the edge device 104A or another edge device, such as the edge device 104B, and continue to perform uplink and downlink communication with high throughput without any interruptions. Similarly, in accordance with an embodiment, the central cloud server 102 may be further configured to determine that no handover is required for the edge device 104A or the other edge device, such as the edge device 104B, when a performance state of a wireless connection of the UE, such as the first UE 106A, is greater than a threshold performance value.

Beneficially, multiple UEs, such as the first UE 106A and the second UE 106B, associated with different service providers may be serviced by a single edge device, such as the edge device 104A (e.g., an indoor deployed repeater device or a repeater device deployed as an RSU). Alternatively stated, a single edge device can service multiple UEs associated with different service providers, thereby reducing (i.e., optimizing) the total number of network nodes for each service provider required to be deployed or used to service the same number of UEs in one or more geographical areas.

Furthermore, the edge device 104A ensures seamless connectivity as well as QoE while reducing the infrastructure cost by greater than 50 percent considering just two different service providers, such as the first WCN 110A and the second WCN 110B. The edge device 104A seamlessly handles heterogeneity and supports the plurality of different WCNs 110 for high performance and reliable communication. Furthermore, a consumer, such as the first UE 106A, is provided to choose which WCN (i.e., which service provider) they like to connect to, and this is enabled from the cloud, such as the central cloud server 102. The central cloud server 102 transmits specific initial access information (optimal initial access information) associated with one or more WCNs, such as the first WCN 110A and the second WCN 110B, to the edge device 104A, where such specific initial access information is used by the edge device 104A to establish wireless connectivity bypassing conventional initial-access search. Hence, beneficially, a consumer of a UE, such as the first UE 106A, subscribed to the first WCN 110A can request the edge device 104A in the connection request to relay an RF signal of the first WCN 110A, and if the consumer of the first UE 106A is subscribed to the second WCN 110B, then the first UE 106A can request the edge device 104A, to relay an RF signal of the second WCN 110B. Additionally, and advantageously, as the obtained connectivity enhanced information for the first UE 106A and the second UE 106B is independent of the plurality of different WCNs 110, the complexity and the initial access latency is significantly reduced as the standard beam sweeping operation in the initial access phase is bypassed and is not required to be performed at the first UE 106A and the second UE 106B and the edge device 104A, which in turn improves network performance and reduces additional signaling load (due to standard initial-access search) on associated WCNs of the plurality of different WCNs 110.

In accordance with an embodiment, the control circuitry 214 is further configured to utilize the obtained connectivity enhanced information to, for example: reduce time to align to a timing offset of a beam reception at the edge device 104A to a frame structure of a 5G NR radio frame, and allow uplink and downlink to use complete 5G NR frequency spectrum for different service providers; set beam index or set phase values of the received RF signals to design beams to service the first UE 106A and the second UE 106B in real time or near real time based on the tracked locations of the corresponding users carrying the first UE 106A and the second UE 106B; set parameters, e.g., amplifier gains, and phase responses associated with the one or more donor antenna arrays 206 or the one or more service antenna arrays 210; form specific beam patterns from the edge device 104A specific to cover the first UE 106A and the second UE 106B based on tracking of the locations of the first user 112A and the second user 112B; execute dynamic partitioning of a plurality of antenna elements of the first antenna array 210A of the one or more service antenna arrays 210 at the service side 202B into a plurality of spatially separated antenna sub-arrays to generate multiple beams in different directions at the same time or in a different time slot; set a suitable adjustment of a power back-off to minimize (i.e., substantially reduce) the impact of interference (echo or noise signals) and hence only use as much power as needed to achieve low error communication with the first base station 108A or the second base station 108B in the uplink or the first UE 106A and the second UE 106B in the downlink communication; and optimize blocks of radio and perform Radio access network optimization to improve coverage, capacity and service quality of a geographical area surrounding the edge device 104A.

In accordance with an embodiment, the control circuitry 214 may be further configured to recognize the first UE 106A in motion to be a valid device to receive one or more services from the edge device 104A. The edge device 104A may be in an offline mode or a connected mode. The connected mode refers to a setting in which the edge device 104A may be communicatively coupled to the central cloud server 102. The offline mode refers to a setting or mode where the edge device 104A may not be communicatively coupled to the central cloud server 102. In both the offline mode and the connected mode, the control circuitry 214 can recognize the first UE 106A in motion to be the valid device.

In an implementation, when the first UE 106A is in the communication range of the edge device 104A, an authentication key may be automatically communicated by the first UE 106A to the edge device 104A. The authentication key may be validated locally by the edge device 104A in the offline mode or via the central cloud server 102 in the connected mode, and if the validation is successful, the first UE 106A may be recognized as the valid device. In another implementation, the first UE 106A may have an application that controls the validation between the first UE 106A and the edge device 104A, for example, based on a registered gesture or defined validation data, such as a hash value. In an example, the first UE 106A may be a smartphone that may have the application installed in it, where the application may be communicatively coupled to the central cloud server 102. In another example, the first UE 106A may be a vehicle, in which the application may be installed in a smartphone connected to an in-vehicle infotainment system of the vehicle, or the application may be preinstalled in the vehicle (e.g., in the in-vehicle infotainment system). A unique identity, for example, in the form of the authentication key, or the registered gesture, or other identifying means may be used to identify users associated with the first UE 106A as a valid user to receive services of the central cloud server 102 and the edge device 104A in an implementation. In yet another implementation, the control circuitry 214 may be configured to receive a connection request from the first UE 106A associated with the first WCN 110A of a first service provider. The connection request may be received via an out-of-band communication, such as Wi-Fi, Bluetooth, Li-Fi, a sidelink request (e.g., LTE sidelink, 5G New Radio (NR) sidelink, NR C-V2X sidelink), a vehicle-to-infrastructure (V2I) request, a personal area network (PAN) connection, or other out-of-band connection requests. The control circuitry 214 may be further configured to validate the first UE 106A based on the connection request.

In accordance with an embodiment, the control circuitry 214 may be further configured to obtain a corresponding activation signal from each of the first UE 106A and the second UE 106B. The corresponding activation signal may be generated at the first UE 106A and the second UE 106B using at least one of an application installed in the first UE 106A and the second UE 106B, an authentication key, or a registered gesture. The control circuitry 214 may be further configured to activate the edge device 104A to service the first UE 164A and the second UE 106B based on an authentication of the corresponding activation signal.

In some implementations, in the connected mode, the validation of the first UE 106A as the valid device by the edge device 104A may be controlled by the central cloud server 102 based on communication of sensing information, for example, a current position, a moving direction, a time-of-day, a device ID associated with the first UE 106A. The central cloud server 102 may identify that the device ID is known and communicate such information to the edge device 104A in advance before the first UE 106A reaches the communication range of the edge device 104A as the central cloud server 102 has information of the travel path of the first UE 106A based on the sensing information received from the first UE 106A. Thus, the control circuitry 214 can recognize the first UE 106A in motion to be the valid device directly or indirectly with the assistance of the central cloud server 102.

In an implementation, the control circuitry 214 may be further configured to execute beamforming to direct the first beam of RF signal having the signal strength greater than the threshold to the first user 112A carrying the first UE 106A in motion only when the first UE 106A or the first user 112A is recognized as the valid device, based on the track of the location of the first user 112A. The radiation pattern may be dynamically updated based on the changes in the location of the first user 112A. Such concentration of the beam of RF signal having increased signal strength may be executed for devices that are recognized by the edge device 104A as a valid device to receive such service of consistent high-performance and ultra-reliable communication. Such validation may be put off when the edge device 104A may be deployed indoors for an enterprise, and all the users within the enterprise may be considered as valid users or valid devices. However, such validation may be switched ON when the edge device 104A may be deployed outdoors. However, to opt-in or opt-out of such validation is at user discretion and may be remotely controlled automatically or may be manually set.

In an implementation, instead of the sensor 222, a first portion of the first antenna array 210A may be used for the sensing, and one or more second portions of the first antenna array are used for the beamforming to direct the first beam of RF signal in a defined radiation pattern. In such an implementation, a portion of the same phase array antenna, such as the first antenna array 210A, may be used for the sensing, such as tracking the position of the first UE 106A, whereas other portions of the same phase array antenna may be used for communication of the first beam of RF signal having the signal strength greater than the threshold to the first UE 106A in motion. In such an implementation, the use of a portion of the first antenna array 210A for sensing not only ensures a compact design of antenna and the edge device 104A but may also reduce (i.e., optimize) the power usage of the edge device 104A.

In an implementation, the control circuitry 214 may be further configured to determine that the detected first user 112A carries an XG-enabled UE (e.g., the first UE 106A) and distinguish the first user 112A who carries the XG-enabled UE from other users devoid of any corresponding XG-enabled UEs. The first beam of RF signal may be directed at an XG-carrier frequency at the location of the first user 112A while avoiding directing any beams of RF signals at the XG-carrier frequency to the other users devoid of any corresponding XG-enabled UEs, where XG refers to 5G, beyond 5G, or 6G radio communication. The edge device 104A may include a UE power detector feature, by which the service side 202B of the edge device 104A (e.g., a relay or a repeater device) can identify the location of the XG-enabled UE (e.g., the first UE 106A) to form a closed loop control system, i.e., the sensor 222 (e.g., a FMCW radar in this case) may locate the movement of a person, but how to distinguish that it is a 5G UE and not just a person walking nearby (e.g., moving in front of, across, or behind) the service side 202B of the edge device 104A. Beneficially, the control circuitry 214 is able to execute a check whether the detected first user 112A carries the XG-enabled UE or not even without the need to install any software application on the XG-enabled UE (e.g., a 5G-enabled smartphone like the first UE 106A). The control circuitry 214 is able to filter and distinguish people without XG-enabled UEs from people with XG-enabled UEs. This is very useful for known reasons that most people resist installing apps in their smartphones. Advantageously, the edge device 104A do not require the XG-enabled UEs to use any pre-installed application or do not need introducing any application on any XG-enabled UEs (e.g., a 5G-enabled smartphone), but still is able to differentiate between people not carrying XG-enabled UEs (i.e., 5G-enaled smartphones) from people carrying XG-enabled UEs. The one or more service antenna arrays 210 of the edge device 104A is configured to fire a plurality of test beams of RF signals as the user moves by electronic beam steering using different beam indexes of a beam book, which may be a modified beam book, to confirm that the detected first user 112A carries the XG-enabled UE. A pre-loaded beam book used typically in communication devices like repeaters is modified, referred to as the modified beam book. An example of the modified beam book is shown and described, for example, in FIG. 3C. A communication device, such as a repeater, is typically blind to the presence of people, and mainly detects location of people or users using known beam sweeping and uplink and downlink beam measurements. Beneficially, in the present disclosure, in order to determine the detected first user 112A carries the XG-enabled UE (e.g., the first UE 106A) and distinguish the first user 112A who carries the XG-enabled UE from other users devoid of any corresponding XG-enabled UEs with increased accuracy and certainty (almost 100% accuracy), the edge device 104A correlates the radar data from the sensor 222 (e.g., a Radar) with a beam power level data of a given beam index. If the radar data from the sensor 222 indicates that the first user 112A is in a certain direction and location in the surrounding area of the edge device 104A and further a given beam of a given beam index (say beam #51) fired in that same direction from the one or more service antenna arrays 210 at the service side 202B of the edge device 104A also indicates a highest signal power level communicated to and from the XG-enabled UE at almost same location, then it can be established that the first user 112A carries the XG-enabled UE. An example of the modified beam book and details of operations to determine if a given user carries the XG-enabled UE or not is further explained, for example, in FIG. 3C.

In another aspect, the edge device 104A may comprise the first antenna array 210A, the sensor 222 configured to sense a surrounding area of the edge device 104A, and the control circuitry 214, where the control circuitry 214 may be configured to detect the first user 112A in the surrounding area of the edge device 104A sensed by the sensor 222. The control circuitry 214 may be further configured to track the location of the detected first user 112A in the surrounding area of the edge device 104A based on the sensor 222. The control circuitry 214 may be further configured to control the first antenna array 210A to direct a first beam of RF signal at the location of the first user 112A being tracked based on the sensor 222.

In accordance with an embodiment, the control of the first antenna array 210A to direct the first beam of RF signal may comprise selecting a first radiation pattern from a plurality of radiation patterns based on a distance of the first user 112A from the edge device 104A, where the first radiation pattern is associated with the first communication range with respect to the edge device 104A. The control of the first antenna array 210A to direct the first beam of RF signal may further comprise executing beamforming in the first radiation pattern selected from the plurality of radiation patterns to make the first beam of RF signal to be directed in a first direction of the first user 112A to reach the first user 112A present in the first communication range. The control of the first antenna array 210A to direct the first beam of RF signal may further comprise updating beamforming to a second radiation pattern from the first radiation pattern to make the directed first beam of RF signal reach the first user 112A, where the second radiation pattern is associated with a second communication range with respect to the edge device 104A, and where the beamforming is updated to the second radiation pattern when the first user 112A moves to the second communication range from the first communication range.

In accordance with an embodiment, the control circuitry 214 may be further configured to detect and track a location of the second user 112B concurrently with the first user 112A in the surrounding area of the edge device 104A based on the sensor 222. The control circuitry 214 may be further configured to update the control of the first antenna array 210A such that the second beam of RF signal is directed in a second direction towards the second user to reach the second user 112B concomitant to the first beam of RF signal that is directed in a first direction towards the first user 112A to reach the first user 112A.

Figure 2B:
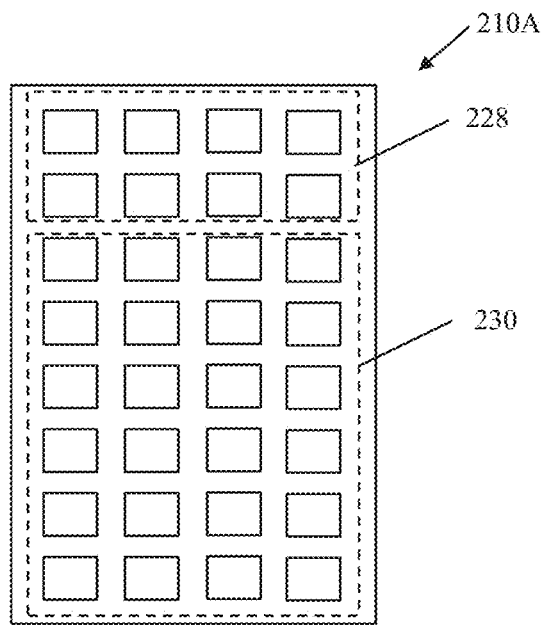
FIG. 2B is a diagram illustrating an antenna array of an edge device, in accordance with an embodiment of the disclosure.

FIG. 2B is a diagram illustrating an antenna array of an edge device, in accordance with an embodiment of the disclosure. FIG. 2B is explained in conjunction with elements from FIGS. 1 and 2A. With reference to FIG. 2B, there is shown the first antenna array 210A of the edge device 104A that may be a multi-function edge device, where a first portion 228 of the first antenna array 210A is used for the sensing to sense a surrounding area of the edge device 104A and tracking of objects and a second portion 230 of the first antenna array 210A used for the calibration for forming the first beam of RF signal in the calibrated radiation pattern. The first portion 228 may include a first set of antenna elements that radiate an RF wave in a first frequency (e.g., an out-of-band mmWave frequency) for the sensing of the surrounding area and for tracking the one or more users carrying the one or more UEs 106 in a first communication range. The second portion 230 may include a second set of antenna elements that radiate beamformed RF wave, i.e., the beam of RF signals in a second frequency (e.g., an in-band mmWave frequency that is owned or operated by one of the plurality of different WCNs 110) for an uplink and a downlink cellular communication with the tracked one or more UEs 106 in a second communication range. In this implementation, the count of antenna elements in the second set of antenna elements may be greater than the first set of antenna elements. Furthermore, the first communication range may be greater than the second communication range so that sensing and tracking of the location of the one or more users carrying the one or more UEs 106, such as the first UE 106A, may be successfully executed much ahead of time before the one or more UEs 106, such as the first UE 106A, enters the second communication range of the edge device 104A. For example, the control circuitry 214 by use of the first portion 228 is configured to determine a velocity, a moving direction, a distance, an angle, a local travel path (e.g., a trajectory of motion) of the first UE 106A based on the track of the first user 112A before the first user 112A associated with the first UE 106A enters the second communication range of the edge device 104A. This provides the control circuitry 214 some leverage to perform the activation of the beamforming function 220 and perform preprocessing for the beamforming of the best suitable radiation pattern based on the tracking in advance so that as soon as the one or more users along with the one or more UEs 106, such as the first UE 106A, enters the second communication range, the first beam of RF signal having a signal strength greater than a threshold can be concentrated on the first user 112A carrying the first UE 106A in motion that is already being tracked precisely. The first beam of RF signal may relay a data stream to/from a source, such as the first base station 108A, to/from the first UE 106A.

In some implementations, the first portion 228 may be a predefined portion (in the first antenna array 210A) that is configured for sensing. Similarly, the second portion 230 of the first antenna array 210A may be another predefined portion (in the first antenna array 210A) that is configured for the beamforming.

In some implementations, the control circuitry 214 may be configured to execute dynamic partitioning of a plurality of antenna elements of the first antenna array 210A into a plurality of spatially separated antenna sub-arrays, where one spatially separated antenna sub-array may be used as a sensing radar for the sensing purpose whereas other spatially separated antenna sub-arrays may be used for the beamforming to either form one radiation pattern to communicate the first beam of RF signal calibration of multiple radiation patterns to generate multiple beams in different directions at the same time or in a different time slot. An example of dynamic partitioning of the plurality of antenna elements of the first antenna array 210A is described in FIG. 2C.

Figure 2C:
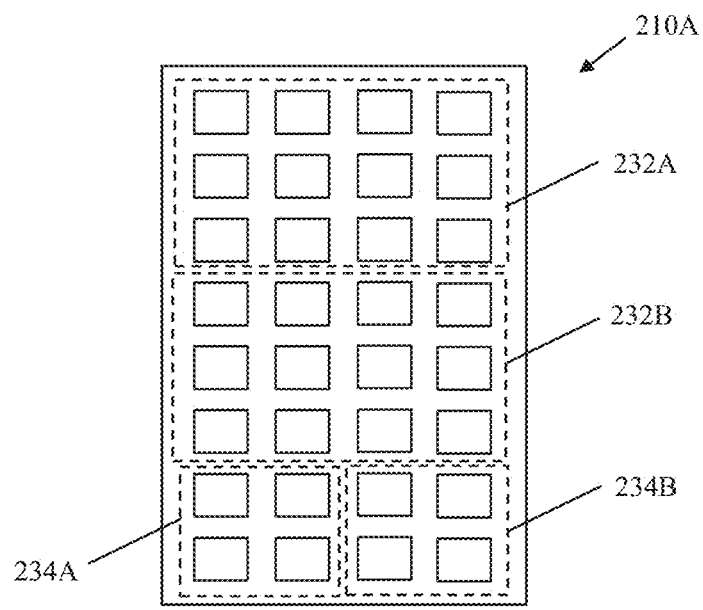
FIG. 2C is a diagram illustrating an antenna array of an edge device, in accordance with another embodiment of the disclosure.

FIG. 2C is a diagram illustrating an antenna array of an edge device, in accordance with another embodiment of the disclosure. FIG. 2C is explained in conjunction with elements from FIGS. 1 and 2A. With reference to FIG. 2B, there is shown the first antenna array 210A of the edge device 104A that may be a multi-function edge device. In this implementation, the control circuitry 214 may be configured to execute dynamic partitioning of a plurality of antenna elements of the first antenna array 210A into a plurality of spatially separated antenna sub-arrays. In this case, two portions of the first antenna array 210A, such as portions 232A and 232B, may be configured to communicate two different beams of RF signals for two UEs, such as the first UE 106A and the second UE 106B concomitantly. The two different beams of RF signals may be communicated in different directions and angles and may have different radiation patterns, such as one may be a narrow beam while the other may be a comparatively wider beam. Similarly, two portions of the first antenna array 210A, such as portions 234A and 234B, may be configured to communicate two RF waves for sensing purposes to sense and track objects in different areas (e.g., UEs coming towards edge device 104A may be considered as one area, whereas UEs moving away from the edge device 104A may be considered as another area) of the surrounding area of the edge device 104A and track multiple UEs in motion at the same time.

Figure 3A:
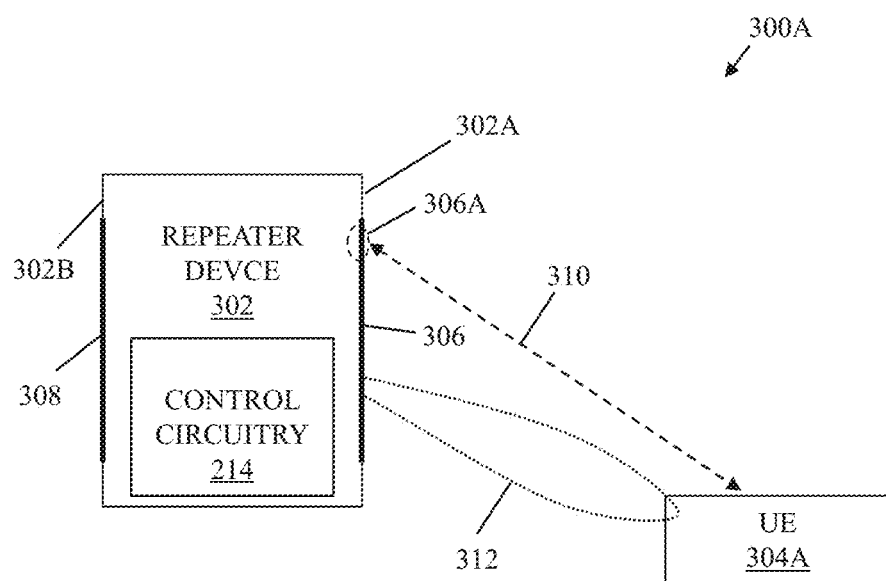
FIG. 3A is a diagram illustrating a first exemplary scenario for implementation of the edge device for high performance and reliable communication, in accordance with an embodiment of the disclosure.

FIG. 3A is a diagram illustrating a first exemplary scenario for implementation of the edge device for high-performance communication, in accordance with an embodiment of the disclosure. FIG. 3A is explained in conjunction with elements from FIGS. 1 and 2A, 2B, and 2C. With reference to FIG. 3A, there is shown an exemplary scenario 300A. The exemplary scenario 300A includes a 5G-enabled repeater device, hereinafter simply referred to as a repeater device 302, and a user equipment (UE) 304A, which may be a vehicle in the exemplary scenario 300A. The repeater device 302 comprises the control circuitry 214, a first antenna array 306 at a service side 302A of the repeater device 302, and a second antenna array 308 at a donor side 302B of the repeater device 302.

In accordance with the exemplary scenario 300A, the repeater device 302 corresponds to the edge device 104A, and the UE 304A corresponds to the first UE 106A (FIGS. 1 and 2). The UE 304A may be a vehicle moving away from the repeater device 302 that may be deployed at a fixed location, such as roadside. The control circuitry 214 may be configured to activate the sensing function 218 to sense a surrounding area of the repeater device 302. In an implementation, the control circuitry 214 may be configured to activate the sensing function 218 automatically when a moving object, such as the UE 304A, is detected within a communication range. In another implementation, the control circuitry 214 may be configured to activate the sensing function 218 based on an activation signal received from the UE 304A. Due to inadequate data throughput and signal strength of a cellular connectivity directly from a base station, such as the first base station 108A, the activation signal may be communicated by the UE 304A to the repeater device 302, for example, via an out-of-band channel, such as a Wi-Fi or other personal area network communication channel. The UE 304A may have a preinstalled application. Based on a defined setting, the preinstalled application may cause the UE 304A to send the activation signal automatically to the repeater device 302 when the UE 304A moves within a communication range of the repeater device 302. Alternatively, based on user input to an application interface of the preinstalled application, the UE 304A may send the activation signal to the repeater device 302. In yet another implementation, the central cloud server 102 may be communicatively coupled to the preinstalled application of the UE 304A and may detect the location of the UE 304A, and thereafter may direct the application to cause to the UE 304A to communicate the activation signal to the repeater device 302.

The repeater device 302 may be a multi-function edge device in which a first portion 306A of the first antenna array 306 is used for the sensing. In another implementation, a separate sensor, such as the sensor 222, may be used for sensing and tracking purposes. In an implementation, the control circuitry 214 may be further configured to recognize the UE 304A in motion to be a valid device to receive one or more services from the repeater device 302 by use of the first portion 306A of the first antenna array 306. In another implementation, such validation may not be performed. The control circuitry 214 may be further configured to track a location of the UE 304A or a user carrying the UE 304A with a centimeter-level accuracy (i.e., less than 5 or 10 cm of positioning error) in motion from the repeater device 302 by use of the first portion 306A of the first antenna array 306 or the sensor 222. For example, an RF wave 310 may be communicated to sense and track the location of the UE 304A or the user carrying the UE 304A. The control circuitry 214 may be further configured to execute beamforming to direct the first beam of RF signal 312 having a signal strength greater than a threshold towards the UE 304A (i.e., a stronger signal is concentrated on the UE 304A) or the user carrying the UE 304A, based on the tracking of the location of the user carrying the UE 304A or tracking of the UE 304A.

In an implementation, the first beam of RF signal 312 may be communicated in a radiation pattern (i.e., a defined shape, such as a narrow or pencil beam) from the same antenna array, i.e., one or more second portions of the first antenna array 306, while the sensing is executed concomitantly by the first portion 306A of the first antenna array 306. In another implementation, the first beam of RF signal 312 may be communicated in a radiation pattern (i.e., a defined shape, such as a narrow or pencil beam) from the first antenna array 306, while the sensing and tracking is executed concomitantly by the sensor 222. Thus, the UE 304A may be able to execute uplink and downlink communication via the repeater device 302 with a comparatively higher data throughput rate based on the concentrated signal continuously received from the repeater device 302 even though the UE 304A rapidly changes its position and orientation while in motion along a travel path. Furthermore, the repeater device 302 that acts as an edge device is independent of the plurality of different WCNs 110 and thus can provide services to the UE 304A either in the first WCN 110A or the second WCN 110B as per choice or a current subscription of the UE 304A to a particular service provider to ensure seamless connectivity and increase QoE.

In accordance with another exemplary aspect, the repeater device 302 may not be deployed at a fixed location and maybe instead installed at a vehicle and act as an edge device. The UE 304A may also be present within the vehicle. Thus, in this exemplary aspect, the repeater device 302 and the UE 304A may be co-located at the vehicle; however, the repeater device 302 may be wirelessly connected to the central cloud server 102 over an LTE control channel independent of the UE 304A. Alternatively stated, the repeater device 302 is communicatively coupled to the central cloud server 102 irrespective of the connectivity of the UE 304A. Further, in this exemplary aspect, the central cloud server 102 may be configured to predict a travel path of the repeater device 302 in motion (that moves along the vehicle in this case). In other words, the central cloud server 102 predicts the travel path that the UE 304A is likely to take based on sensing information received from the repeater device 302. The repeater device 302 may further include a sensor, for example, a geospatial position sensor (such as a GPS sensor), which may capture the velocity of its movement. This captured sensing information, for example, the velocity (e.g., indicating speed and moving direction) is used by the central cloud server 102 to determine one or more alternative wireless connectivity options that may be made available to the UE 304A in motion. In other words, the central cloud server 102 may be guided by the velocity information, which in turn may trigger the central cloud server 102 to elastically alter how many directives (or instructions for alternative wireless connectivity options) it queues to the repeater device 302. The central cloud server 102 may be configured to pre-load impending choices in terms of one or more alternative wireless connectivity options to minimize signaling latency between the repeater device 302 and a base station and/or the central cloud server 102 (In this case the UE 304A may be in a vehicle where the repeater device 302 is co-located as an edge device within a vehicle). In other words, the central cloud server 102 may be configured to communicate one or more alternative wireless connectivity options to the repeater device 302 (i.e., an edge device), where the one or more alternative wireless connectivity options are used by the UE 304A (which may be communicatively coupled to the repeater device 302) as fallback options to maintain consistent wireless connectivity to a base station or the repeater device 302 (i.e., the edge device). Since the control channel may at times be lost briefly, such pre-loaded one or more alternative wireless connectivity options may be used by the UE 304A as guidance when cellular connectivity (e.g., 5G wireless connection) is lost for several seconds, such as when the UE 304A and the repeater device 302 provided in the vehicle moves in a tunnel or in some remote areas where cellular coverage is sparse. In an implementation, the prediction of the travel path of the repeater device 302 (and the UE 304A that is co-located) in motion may be executed based on the machine learning model of the central cloud server 102.

In an implementation, the determined one or more alternative wireless connectivity options made available to the repeater device 302 as well as the UE 304A in motion comprises a plurality of different specific initial access information, where each of the plurality of different specific initial access information is capable of assisting the repeater device 302 (e.g., an edge device) to bypass an initial access-search on the repeater device 302. Each of the plurality of different specific initial access information is an alternative option for wireless cellular connectivity communicated to the repeater device 302 based on the current and upcoming position of the repeater device 302 along the predicted travel path. In an example, the central cloud server 102 may be configured to communicate two or more choices, say, four alternative wireless connectivity options, for example, a first, second, third, and fourth choice for wireless connectivity so that the repeater device 302 can continue with mmWave connection with the least amount of service disruption. Alternatively stated, when the primary choice fails (i.e., the first communicated wireless connectivity enhanced information that includes a first specific initial access information is not usable for some unforeseen reasons, like loss of signal in a tunnel), other alternative wireless connectivity options can be selected to maintain continuous 5G connectivity for enhanced QoE by the repeater device 302 as well as the UE 304A (which may be connected for uplink and downlink communication via the repeater device 302). Thus, having more alternative wireless connectivity options act as a powerful technique to maintain consistent 5G connectivity irrespective of an internal beam acquisition process of the repeater device 302. Moreover, as such alternative wireless connectivity options may comprise specific initial access information, the standard beam acquisition process is shortened, i.e., the time to scan and acquire new initial access information is shortened, and consequently, failure detection and recovering from it using the provided multiple alternative wireless connectivity options comprises plays a prominent role in increasing the QoE. Furthermore, as the repeater device 302 also communicates the sensing information, including the moving direction of the UE 304A, a time-of-day, local traffic information, local road information, local construction information, local traffic light information, the prediction of the travel path can be made more accurately with more accurate failure detection and recovering options.

In accordance with yet another exemplary aspect, the repeater device 302 may be a ceiling unit deployed indoors at a fixed location. The UE 304A may be a smartphone carried by a user, such as a first user 112A (of FIG. 1). The repeater device 302 may include the first antenna array 306 that may not execute sensing function, for example, in this exemplary aspect. The repeater device 302 may include the sensor 222 that may be configured to sense the surrounding area of the repeater device 302. The control circuitry 214 of the repeater device 302 may be configured to detect the user (e.g., the first user 112A) in the surrounding area of the repeater device 302 sensed by the sensor 222. The control circuitry 214 may be further configured to track the location of the detected user (e.g., the first user 112A) in the surrounding area of the repeater device 302 based on the sensor 222. The control circuitry 214 may be further configured to control the first antenna array 306 to direct a first beam of RF signal towards the user (e.g., the first user 112A) and at the location of the user (e.g., first user 112A carrying the UE 304A) based on continuous tracking performed by use of the sensor 222. The first beam of RF signal may be made to follow the user (e.g., the first user 112A carrying the UE 304A), where the first beam of RF signal may be shaped dynamically in different radiation patterns in accordance with changes in the distance of the user (e.g., first user 112A carrying the UE 304A) from the repeater device 302 as the user moves near or away from the repeater device 302 to maintain consistent QoE and high throughput, for example, multi-gigabit data rate.

Figure 3B:
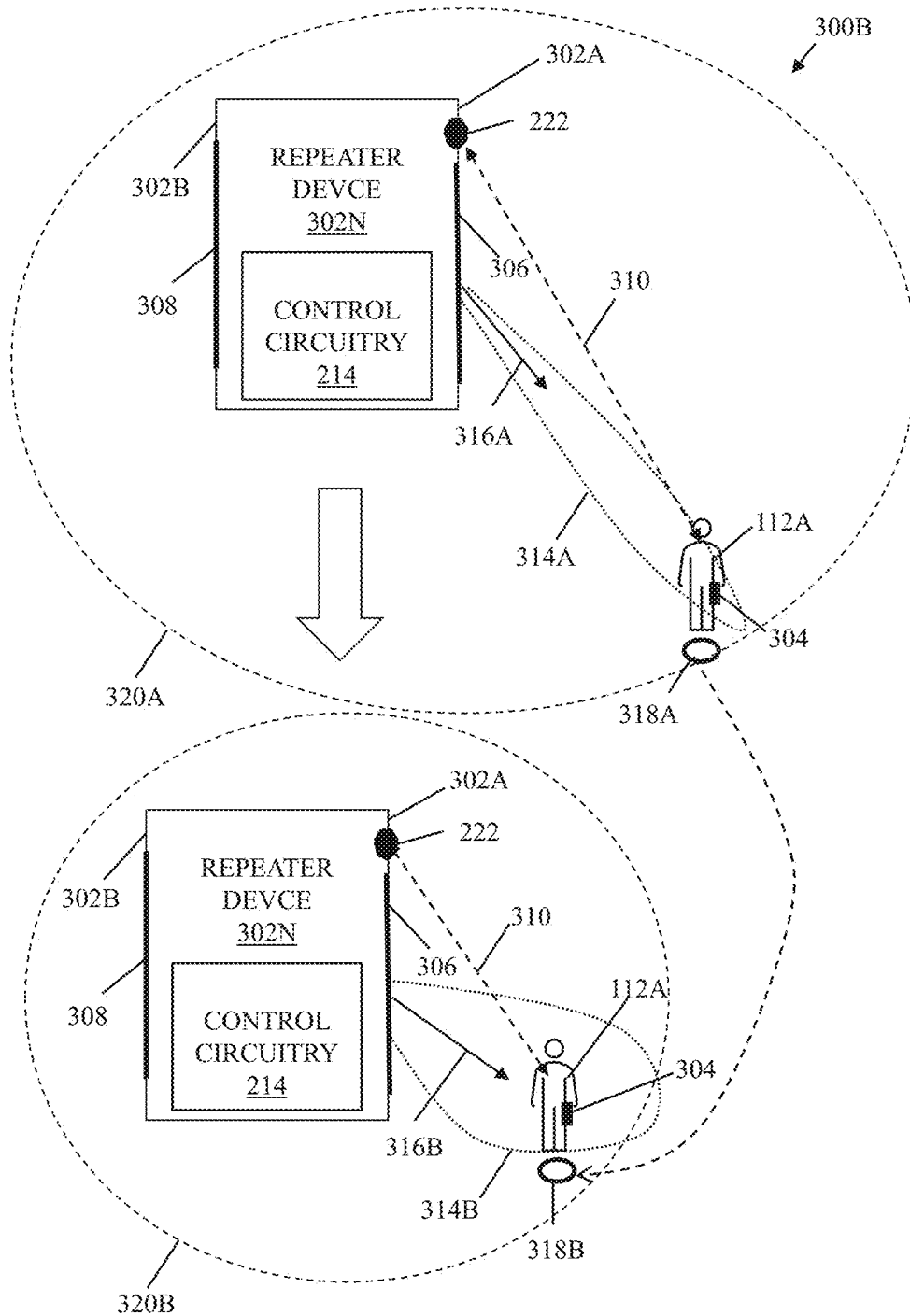
FIG. 3B is a diagram illustrating a second exemplary scenario for implementation of the edge device and method for sensor-assisted beamforming for high performance and reliable communication, in accordance with an embodiment of the disclosure.

FIG. 3B is a diagram illustrating a second exemplary scenario for implementation of the edge device and method for sensor-assisted beamforming for high performance and reliable communication, in accordance with an embodiment of the disclosure. FIG. 3B is explained in conjunction with elements from FIGS. 1, 2A, and 3A. With reference to FIG. 3B, there is shown an exemplary scenario 300B. The exemplary scenario 300B includes a 5G-enabled repeater device, hereinafter simply referred to as the repeater device 302N, which is similar to that of the repeater device 302 of FIG. 3A except that the sensor 222 is integrated with the repeater device 302N. In an example, the repeater device 302N may be deployed indoors at a fixed location within an enterprise as a part of a private network. In another example, the repeater device 302N may be a ceiling unit deployed indoors to service one or more UEs beneath the ceiling in an enclosed area (e.g., a room or office space). In yet another example, the repeater device 302N may be deployed outdoors, for example, at a corner of a building or a street-cross section, for example, to overcome the signal obstruction. There is further shown a UE 304B, which may be a smartphone carried by the first user 112A. The repeater device 302N may further include the control circuitry 214, the first antenna array 306 at the service side 302A of the repeater device 302N, and a second antenna array 308 at the donor side 302B of the repeater device 302N.

In accordance with the exemplary scenario 300B, the repeater device 302 corresponds to the edge device 104A, and the UE 304B corresponds to the first UE 106A (FIG. 1). In operation, the sensor 222 may be configured to sense a surrounding area of the repeater device 302N. The control circuitry 214 of the repeater device 302N may be configured to detect the first user 112A in the surrounding area of the repeater device 302N and track the detected first user 112A in the surrounding area of the repeater device 302N based on the sensor 222. For example, an RF wave 310 may be communicated to sense and track the location of one or more objects, such as the first user 112A carrying the UE 304B. The sensor 222 may emit the RF wave 310 in a first frequency, for example, an out-of-band frequency for sensing and tracking purposes. The control circuitry 214 may be further configured to control the first antenna array 306 to direct a first beam of RF signal having a signal strength greater than a first threshold in a first direction 316A of the first user 112A being tracked based on the sensor 222. The first beam of RF signal may be communicated in a second frequency (e.g., an in-band frequency in 5G band) that may be different from the first frequency. The control of the first antenna array 306 to direct the first beam of RF signal may comprise selecting a first radiation pattern 314A (e.g., a pencil beam or a narrow beam) from a plurality of radiation patterns based on a distance of the first user 112A from the repeater device 302N, where the first radiation pattern 314A is associated with a first communication range 320A with respect to the repeater device 302N. The control of the first antenna array 306 to direct the first beam of RF signal may further comprise executing beamforming in the first radiation pattern 314A selected from the plurality of radiation patterns to make the directed first beam of RF signal reach the first user 112A tracked at a first location 318A that is within the first communication range 320A (e.g., farthest away from the repeater device 302N).

The first user 112A may move near the repeater device 302N, for example, to a second location 318B from the first location 318A. Based on the continuous tracking of the first user 112A, the first beam of RF signal may be made to follow the first user 112A to enable the UE 304B carried by the first user 112A to perform uplink and downlink communication with a RAN node, such as a gNB or a small cell, via the repeater device 302N without interruptions. The control circuitry 214 may be further configured to periodically update the radiation pattern of the first beam of RF signal in accordance with the changes in the location of the first user 112A carrying the UE 304B. For instance, the radiation pattern may become less narrow from the first radiation pattern 314A as the first user 112A approaches towards the repeater device 302N. The control circuitry 214 may be further configured to update the beamforming to a second radiation pattern 314B (e.g., a broad beam or a flower beam) to make the directed first beam of RF signal reach the first user 112A, where the second radiation pattern 314B is associated with a second communication range 320B with respect to the repeater device 302N. The second communication range 320B may be less than the first communication range 320A. The beamforming may be updated to the second radiation pattern 314B having the signal strength greater than a second threshold when the first user 112A moves to the second communication range 320B from the first communication range 320A to maintain connectivity with the RAN node, such as the gNB or the small cell with consistently high throughput and adequate signal strength using the repeater device 302N. The repeater device 302N thus executes sensing, tracking, and beamforming cooperatively in real-time or near real-time that enables making faster and accurate decisions to alter the beams as per need without any increase in signaling load on a cellular network and further ensures the best performance consistently in terms of high throughput data rate as well as ultra-reliable communication as compared to existing systems. Further, the repeater device 302N and the method of the present disclosure ensure seamless connectivity as well as QoE while reducing the infrastructure cost due to effective management and concentration of radiation pattern of the beams of RF signals having higher signal strength due to precise sensing, tracking, and beamforming functions that work in cooperation.

Figure 3C:
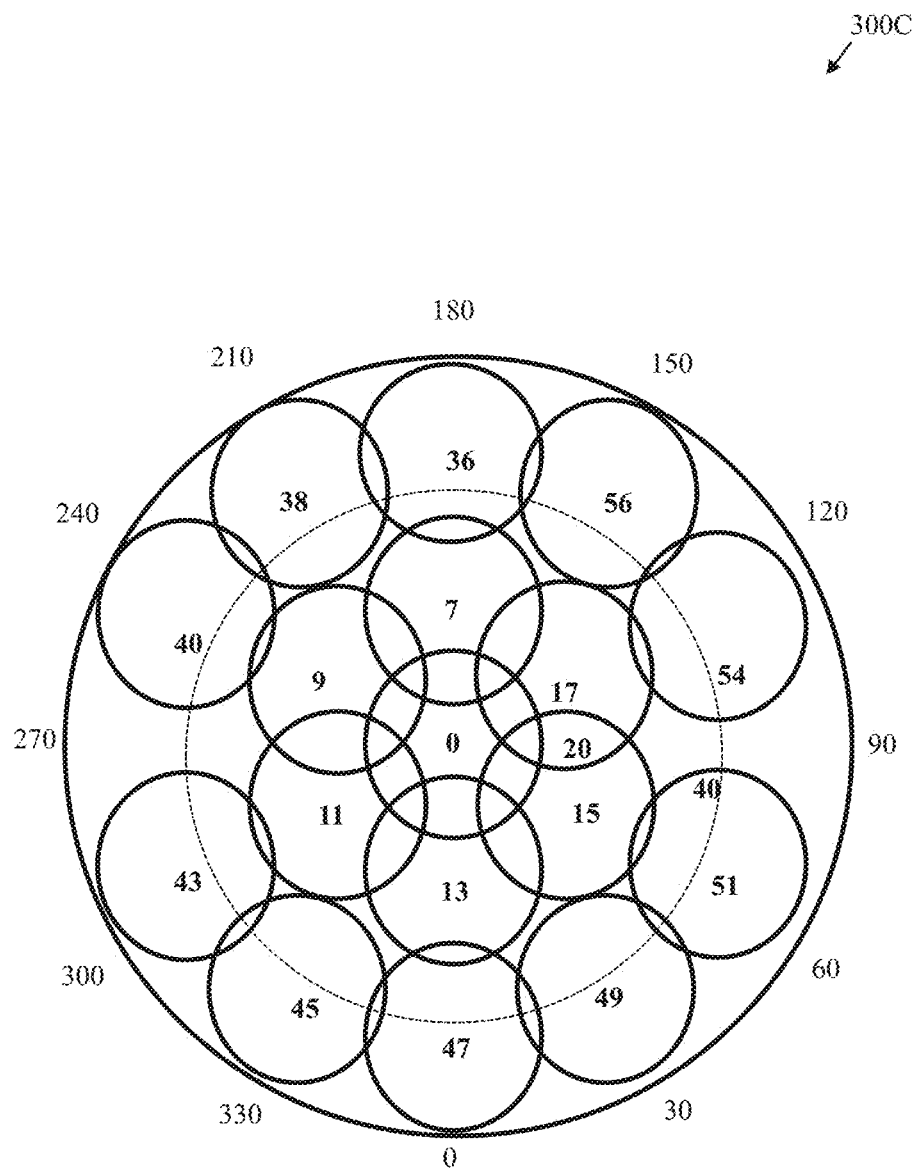
FIG. 3C is a diagram illustrating a third exemplary scenario for implementation of the edge device and method for sensor-assisted beamforming for high performance and reliable communication, in accordance with an embodiment of the disclosure.

FIG. 3C is a diagram illustrating a third exemplary scenario for implementation of the edge device and method for sensor-assisted beamforming for high performance and reliable communication, in accordance with an embodiment of the disclosure. FIG. 3C is explained in conjunction with elements from FIGS. 1, 2A, and 3B. With reference to FIG. 3C, there is shown an exemplary scenario 300C. The exemplary scenario 300C depicts a modified beam book. A typical pre-loaded beam book used typically in communication devices like repeaters may be modified, referred to as the modified beam book. A typical pre-loaded beam book generally includes a plurality of beam indexes arranged in a vertical direction, like a list of beam indexes. In this exemplary scenario 300C, in the modified beam book, the plurality of beam indexes may be arranged in horizontal direction (horizontal with respect to surface of ground plane) depicted by a gum-stick representation (small, rounded circles), as shown. Such beam indexes (i.e., gum-sticks) are mapped horizontally in the edge device 104A, for example, at the one or more service antenna arrays 210 at the service side 202B. The one or more service antenna arrays 210 at the service side 202B of the edge device 104A may be configured to fire a plurality of test beams of RF signals by electronic beam steering using different beam indexes of the modified beam book, to confirm that the detected first user 112A carries the XG-enabled UE. A communication device, such as the repeater, is typically blind to the presence of people, and mainly detects location of UEs using known beam sweeping and uplink and downlink beam measurements, which is time consuming and not very effective. In order to determine the detected first user 112A carries the XG-enabled UE (e.g., the first UE 106A) and distinguish the first user 112A who carries the XG-enabled UE from other users devoid of any corresponding XG-enabled UEs with increased accuracy and certainty (almost 100% accuracy), the edge device 104A correlates the radar data from the sensor 222 (e.g., a Radar) with a beam power level data of a given beam index. If both the radar data from the sensor 222 indicates that the first user 112A is in a certain direction and location in the surrounding area of the edge device 104A and that a given beam of a given beam index (say beam #51) fired in that same direction from the one or more service antenna arrays 210 also indicates a highest signal power level communicated to and from the XG-enabled UE at almost same location, then it can be established that the first user 112A carries the XG-enabled UE.

Typically, there is an uplink and downlink beam power level polling (or sampling) mechanism, where different beams may be fired using different beam indexes, say beam indexes, 40, 43, 11, 45, 47, 49, 51, 40, 20, 54, 56, 36, 38, etc, of the modified beam book, and their power levels (e.g., Reference Signal Received Power (RSRP)) may be measured. There is a finite number of beam indexes (or beams) in a typical telecommunication device, such as a repeater device. When the different beams are fired using different beam indexes, an application processor, such as the control circuitry 214, can poll (sample) power levels across different beams, and detect that more energy is coming from one particular beam, say beam with beam index #51 as compared to other beams having other beam indexes. Moreover, based on the sensor 222 (e.g., a Radar), it is also ascertained that there is a user there in the direction of the beam with beam index #51. This is further correlated with the radar data of the sensor 222 when the user moves, and a different beam with beam index #49, may start to indicate more power level as compared to other beams fired from the service side 202B. Thus, it may be determined with high accuracy if the user carries an XG-enabled UE or not. In other words, electronic steering fires beams circled as the user moves. During experimentation, it was observed that this required no training cycles and the edge device 104A by use of this mechanism was able to adapt to a new deployment location within minutes, where such adaptation is a one-time activity for a given deployed location. It was observed that there was an improvement (i.e., an increase) of about 8 dBm RSRP and 10-40% reduction in power consumption in the edge device 104A when the sensor 222 was used as compared to when sensor 222 was not used, for example, to classify and distinguish people carrying the XG-enabled UEs from other users devoid of any corresponding XG-enabled UEs, and use that information to select and direct a suitable beam (in this case, the beam with beam index #51 and then beam index #49) towards the tracked location and direction of that user. The edge device 104A is able to filter and distinguish people without XG-enabled UEs from people with XG-enabled UEs. This is very useful for known reasons that most people resist installing apps in their smartphones. Advantageously, the edge device 104A do not require the XG-enabled UEs to use any pre-installed application or do not need introducing any application on any XG-enabled UEs (e.g., a 5G-enabled smartphone), but still is able to differentiate between people not carrying XG-enabled UEs (i.e., 5G-enaled smartphones) from people carrying XG-enabled UEs for high performance communication.

Figure 4A:
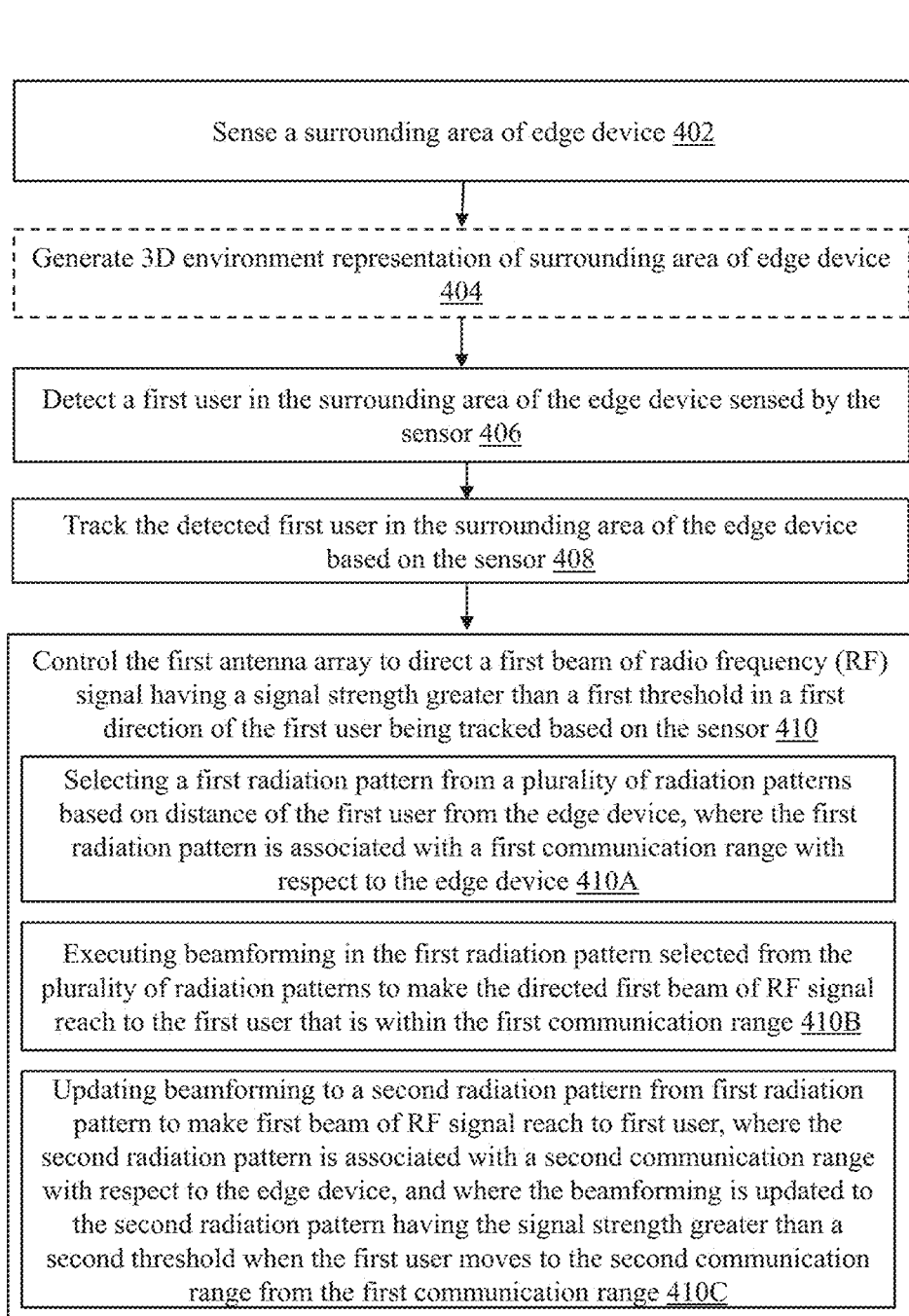
FIGS. 4A, 4B, and 4C, collectively, is a flowchart that illustrates an exemplary method for sensor-assisted beamforming for accelerating user equipment (UE) specific beamforming for high performance and reliable communication, in accordance with an embodiment of the disclosure.
Figure 4B:
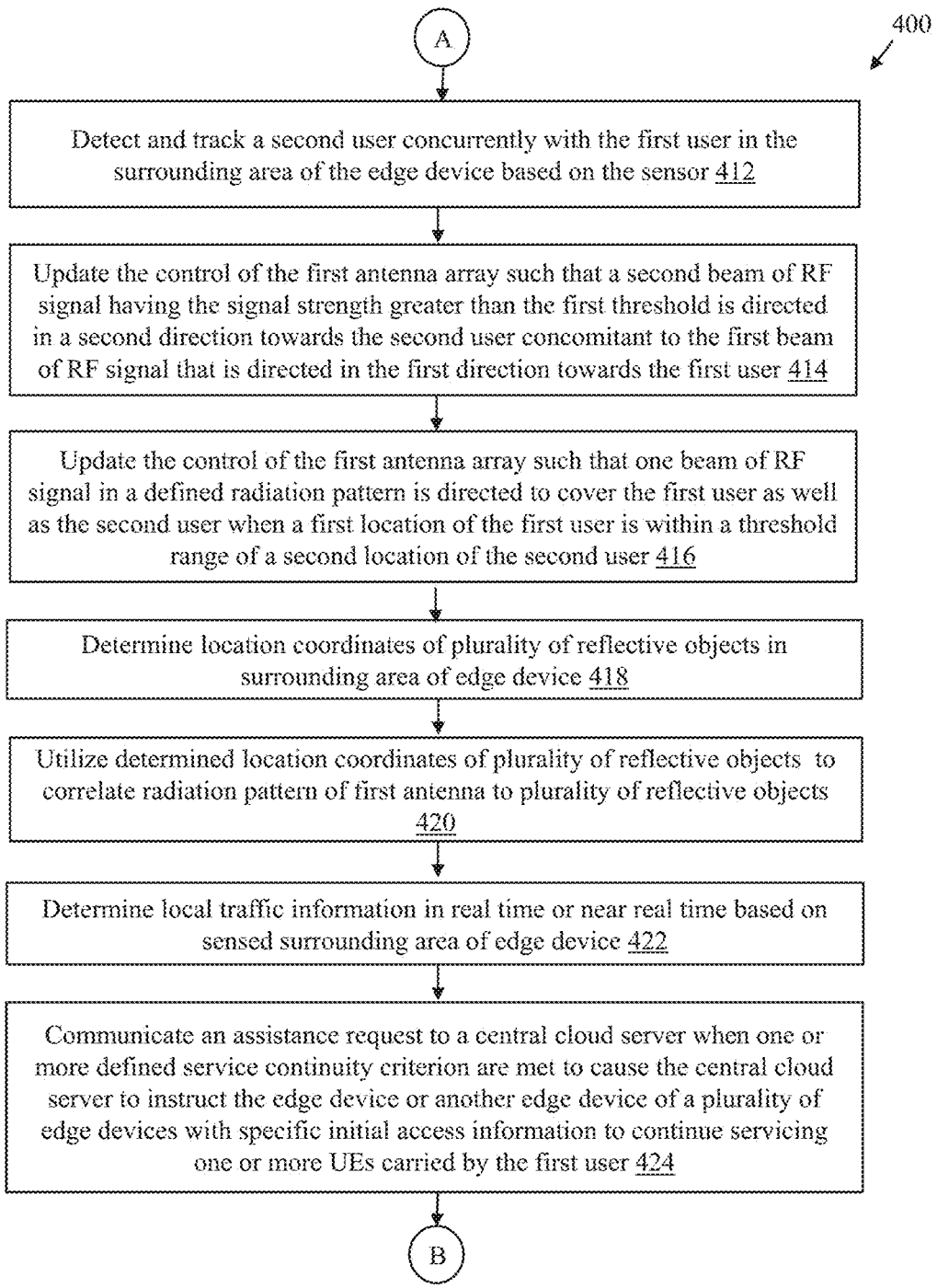
Figure 4C:
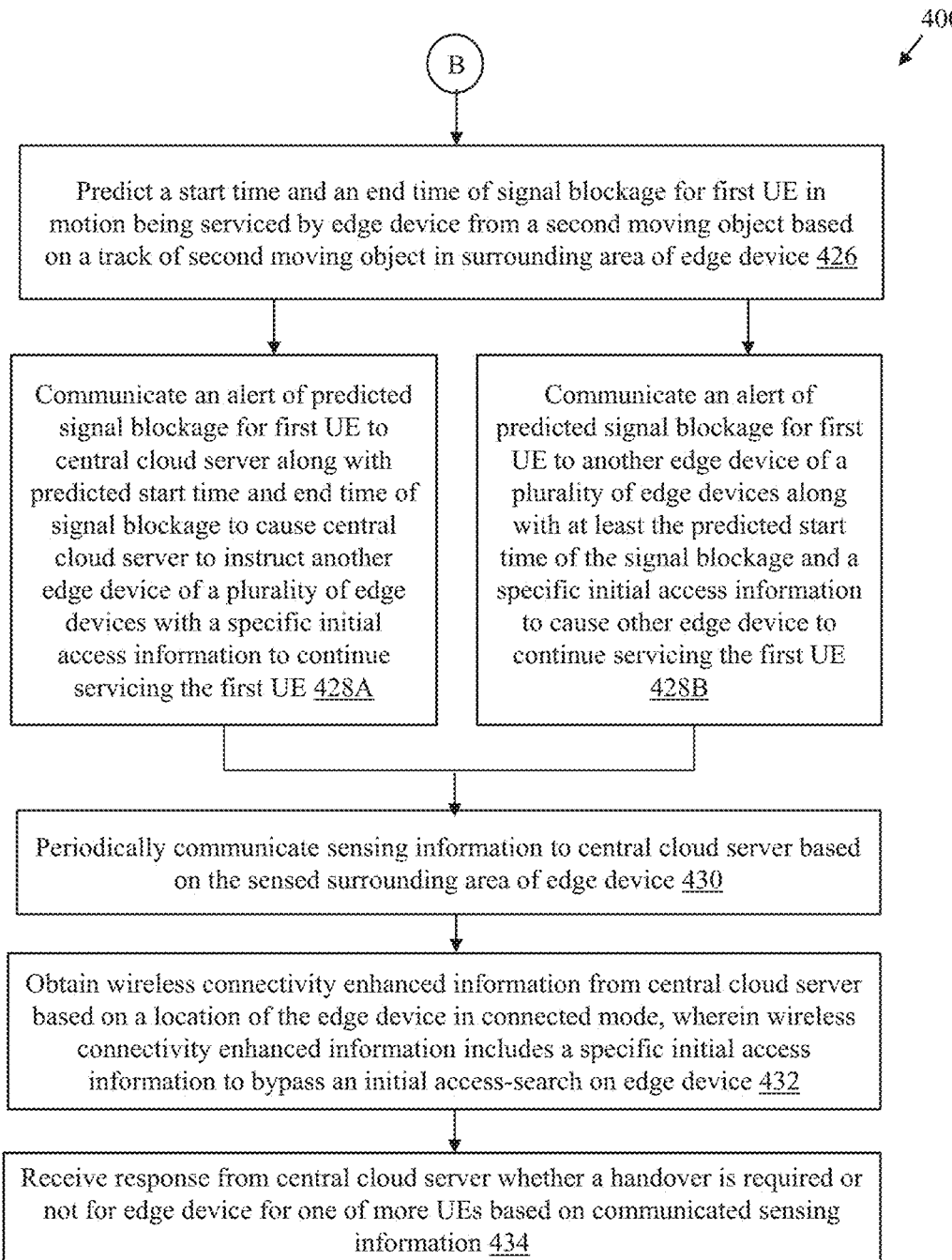

FIGS. 4A, 4B, and 4C, collectively, is a flowchart that illustrates an exemplary method for accelerating user equipment (UE) specific beamforming for high performance and reliable communication, in accordance with an embodiment of the disclosure. FIGS. 4A, 4B, and 4C are explained in conjunction with elements from FIGS. 1, 2A, 2B, 2C, 3A, and 3B. With reference to FIGS. 4A, 4B, and 4C, there is shown a flowchart 400 comprising exemplary operations 402 through 434. The operations of the method depicted in the flowchart 400 may be implemented in the edge device 104A (FIG. 2A).

At 402, a surrounding area of the edge device 104A may be sensed. The control circuitry 214 may be configured to activate a sensing function 218 and signal the sensor 222 to start sensing the surrounding area of the edge device 104A. Alternatively, in one implementation, the sensing may be performed by a portion of the first antenna array 210A.

At 404, a three-dimensional (3D) environment representation of the surrounding area of the edge device 104A may be generated. In an implementation, the control circuitry 214 may be further configured to generate the 3D environment representation of the surrounding area of the edge device 104A.

At 406, the first user 112A may be detected in the surrounding area of the edge device 104A sensed by the sensor 222. The control circuitry 214 may be configured to detect the first user 112A in the surrounding area of the edge device 104A sensed by the sensor 222.

At 408, the detected first user 112A may be tracked in the surrounding area of the edge device 104A based on the sensor 222. The control circuitry 214 may be further configured to track the detected first user 112A carrying the first UE 106A in the surrounding area of the edge device 104A based on the sensor 222. In some implementation, the first UE 106A in motion may be recognized to be a valid device to receive one or more services from the edge device 104A. The control circuitry 214 may be further configured to recognize the first UE 106A in motion to be a valid device.

At 410, the first antenna array 210A may be controlled to direct the first beam of radio frequency (RF) signal having a signal strength greater than the first threshold in a first direction 316A of the first user 112A being tracked based on the sensor 222. The control circuitry 214 may be further configured to control the first antenna array 210A to direct the first beam of RF signal in the first radiation pattern 314A in the first direction of the first user 112A being tracked based on the sensor 222 to reach the first location 318A of the first user 112A. Operation 410, i.e., the control of the first antenna array 210A to direct the first beam of RF signal, may include one or more sub-operations, simply referred to as operations 410A, 410B, and 410C. At operation 410A, the first radiation pattern 314A may be selected from a plurality of radiation patterns based on a distance of the first user 112A from the edge device 104A, where the first radiation pattern is associated with the first communication range 320A with respect to the edge device 104A. At operation 410B, beamforming may be executed in the first radiation pattern 314A selected from the plurality of radiation patterns to make the directed first beam of RF signal reach to the first user 112A that is within the first communication range 320A. At operation 410C, the beamforming may be updated to the second radiation pattern 314B from the first radiation pattern 314A to make the directed first beam of RF signal reach to the first user 112A, where the second radiation pattern 314B is associated with the second communication range 320B with respect to the edge device 104A. The beamforming may be updated to the second radiation pattern 314B having the signal strength greater than a second threshold when the first user 112A moves to the second communication range 320B from the first communication range 320A. In an implementation, it may be also determined that the detected first user 112A carries an XG-enabled UE and then distinguish the first user 112A who carries the XG-enabled UE from other users devoid of any corresponding XG-enabled UEs, where the first beam of RF signal may be directed at an XG-carrier frequency (e.g., 5G NR carrier frequency) only at the location of the first user 112A while avoiding directing any beams of RF signals at the XG-carrier frequency to the other users devoid of any corresponding XG-enabled UEs to save power, where the XG refers to 5G or 6G radio communication.

At 412, a second user 112B may be detected and tracked concurrently with the first user 112A in the surrounding area of the edge device 104A based on the sensor 222. The control circuitry 214 may be further configured to detect and track the second user 112B concurrently with the first user 112A in the surrounding area of the edge device 104A.

At 414, the control of the first antenna array 210A may be updated such that a second beam of RF signal having the signal strength greater than the first threshold is directed in the second direction 316B towards the second user 112B concomitant to the first beam of RF signal that is directed in the first direction 316A towards the first user 112A.

At 416, the control of the first antenna array 210A may be updated such that one beam of RF signal in a defined radiation pattern (e.g., a broad beam or a flower beam) is directed to cover the first user 112A as well as the second user 112B when a first location of the first user 112A is within a threshold range of a second location of the second user 112B.

At 418, location coordinates of a plurality of reflective objects in the surrounding area of the edge device 104A may be determined. The control circuitry 214 may be further configured to determine the location coordinates of the plurality of reflective objects in the surrounding area of the edge device 104A.

At 420, the determined location coordinates of the plurality of reflective objects may be utilized to correlate a radiation pattern of the first antenna array 210A to the plurality of reflective objects for improved directivity of communicated beams of RF signals. The control circuitry 214 may be further configured to utilize the determined location coordinates of the plurality of reflective objects to correlate the radiation pattern of the first antenna array 210A to the plurality of reflective objects. Moreover, a distance and an angle of the edge device 104A from each of a plurality of mobile and stationary objects surrounding the edge device 104A may be determined.

At 422, local traffic information may be determined in real-time or near real-time based on the sensed surrounding area of the edge device 104A. The control circuitry 214 may be further configured to determine the local traffic information in real-time or near real-time.

At 424, an assistance request may be communicated to the central cloud server 102 when one or more defined service continuity criteria are met to cause the central cloud server 102 to instruct the edge device 104A or another edge device 104B of the plurality of edge devices 104 with specific initial access information to continue servicing one or more UEs 106 carried by the first user 112A. The control circuitry 214 may be further configured to communicate the assistance request to the central cloud server 102.

At 426, a start time and an end time of a signal blockage may be predicted for the first UE 106A in motion being serviced by the edge device 104A from a second moving object based on a track of the second moving object in the surrounding area of the edge device 104A. The control circuitry 214 predicts the start time and the end time of the signal blockage for the first UE 106A in motion being serviced by the edge device 104A from the second moving object. The control moves to 428A or 428B based on a defined setting at the edge device 104A.

At 428A, an alert of the predicted signal blockage for the first UE 106A may be communicated to the central cloud server 102 along with the predicted start time and the end time of the signal blockage to cause the central cloud server 102 to instruct another edge device of the plurality of edge devices 104 with specific initial access information to continue servicing the first UE 106A. The control circuitry 214 may be further configured to communicate the alert to the central cloud server 102.

At 428B, an alert of the predicted signal blockage for the first UE 106A may be communicated to another edge device of the plurality of edge devices 104 along with at least the predicted start time of the signal blockage and a specific initial access information to cause the other edge device to continue servicing the first UE 106A. The control circuitry 214 may be further configured to communicate the alert of the predicted signal blockage to another edge device of the plurality of edge devices 104.

At 430, sensing information may be periodically communicated to the central cloud server 102 based on the sensed surrounding area of the edge device 104A. The control circuitry 214 may be further configured to set an offline mode or a connected mode at the edge device 104A, wherein in the connected mode, the control circuitry 214 may be further configured to periodically communicate sensing information to the central cloud server 102 based on the sensed surrounding area of the edge device 104A. The sensing information may comprise a distance and an angle of the edge device 104A from each of a plurality of objects surrounding the edge device 104A, a position of the edge device 104A, a location and a moving direction of a plurality of UEs including the first UE 106A, a time-of-day, local traffic information, local road information, local construction information, a local traffic light information, and local weather information. The central cloud server 102 may be configured to predict a travel path of the edge device 104A (e.g., the repeater device 302) and the first UE 106A in motion when both the edge device 104A and the first UE 106A are co-located in a vehicle. The central cloud server 102 may be further configured to communicate one or more alternative wireless connectivity options to the edge device 104A (e.g., the repeater device 302) where the one or more alternative wireless connectivity options are used by the edge device 104A as well as the first UE 106A as fallback options to maintain consistent wireless connectivity to a base station in a case where the primary connection is lost. An example of the exemplary aspect related to the alternative wireless connectivity options has been described in FIG. 3A.

At 432, wireless connectivity enhanced information may be obtained from the central cloud server 102 based on the location of the edge device 104A in the connected mode. The control circuitry 214 may be further configured to obtain the wireless connectivity enhanced information via the one or more donor antenna arrays 206 from the central cloud server 102 based on the location of the edge device 104A in the connected mode. The wireless connectivity enhanced information may include the specific initial access information to bypass an initial access-search on the edge device 104A.

At 434, a response may be received from the central cloud server 102 whether or not a handover is required for the edge device 104A for one or more UEs based on the communicated sensing information. The control circuitry 214 may be further configured to receive the response from the central cloud server 102 whether a handover is required or not for the edge device 104A for one or more UEs of the plurality of UEs based on the communicated sensing information.

Figure 5:
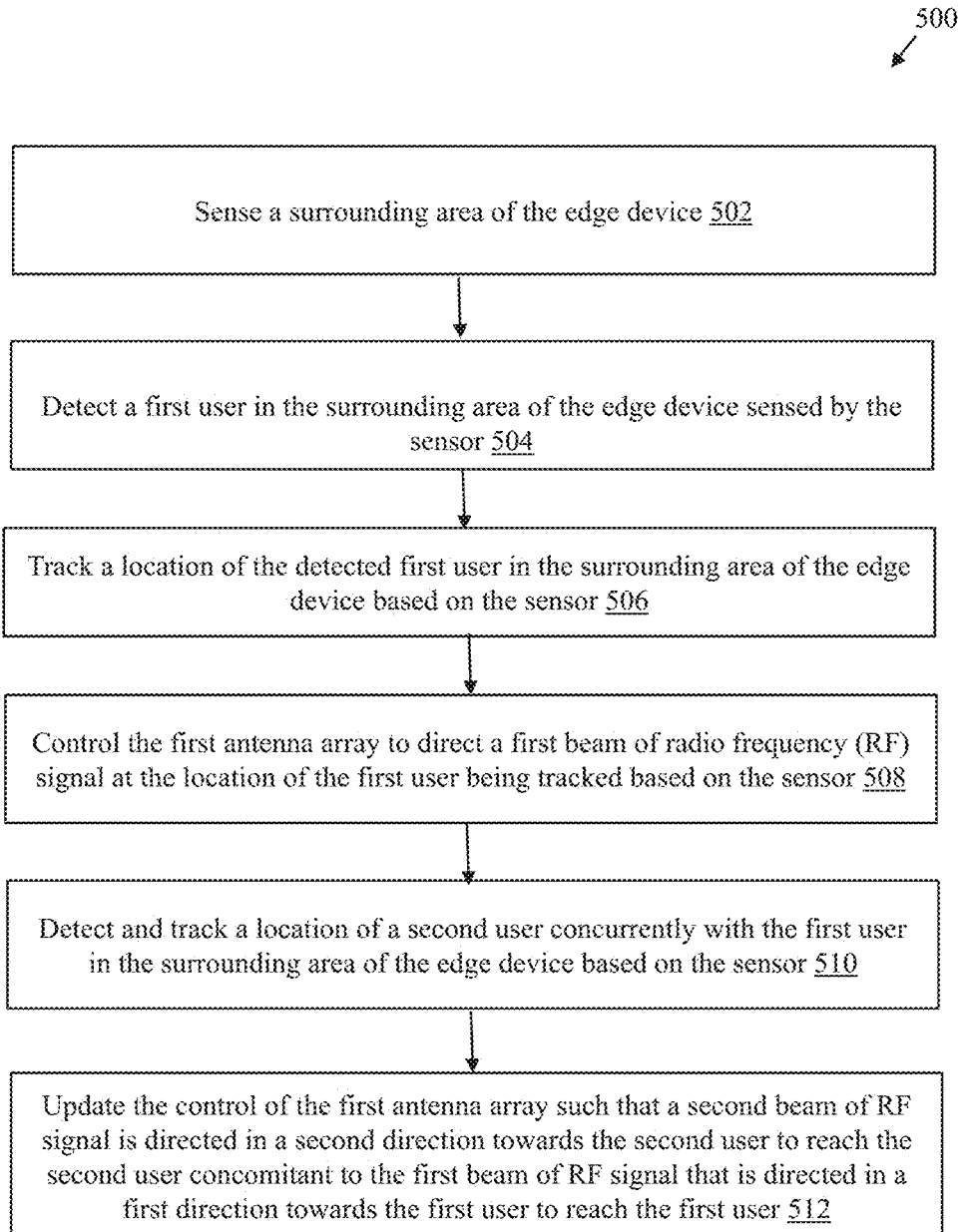
FIG. 5 is a flowchart that illustrates an exemplary method for sensor-assisted beamforming for accelerating user equipment (UE) specific beamforming for high performance and reliable communication, in accordance with another embodiment of the disclosure.

FIG. 5 is a flowchart that illustrates an exemplary method for sensor-assisted beamforming for accelerating UE specific beamforming for high performance and reliable communication, in accordance with another embodiment of the disclosure. FIG. 5 is explained in conjunction with elements from FIGS. 1, 2A, 2B, 2C, and 3B. With reference to FIG. 5, there is shown a flowchart 500 comprising exemplary operations 502 through 512. The operations of the method depicted in the flowchart 500 may be implemented in the edge device 104A (FIG. 2A).

At 502, a surrounding area of the edge device 104A may be sensed. The sensor 222 may be configured to sense the surrounding area of the edge device 104A.

At 504, the first user 112A may be detected in the surrounding area of the edge device 104A sensed by the sensor 222. The control circuitry 214 may be configured to detect the first user 112A in the surrounding area of the edge device 104A sensed by the sensor 222.

At 506, a location of the detected first user 112A may be tracked in the surrounding area of the edge device 104A based on the sensor 222. The control circuitry 214 may be further configured to track the location of the detected first user 112A in the surrounding area of the edge device 104A based on the sensor 222.

At 508, the first antenna array 210A may be controlled to direct a first beam of radio frequency (RF) signal at the location of the first user 112A being tracked based on the sensor 222. The control circuitry 214 may be further configured to control the first antenna array 210A to direct a first beam of radio frequency (RF) signal at the location of the first user 112A being tracked based on the sensor 222. In an implementation, it may be also determined that the detected first user 112A carries an XG-enabled UE and then distinguish the first user 112A who carries the XG-enabled UE from other users devoid of any corresponding XG-enabled UEs, where the first beam of RF signal may be directed at an XG-carrier frequency (e.g., 5G NR carrier frequency) only at the location of the first user 112A while avoiding directing any beams of RF signals at the XG-carrier frequency to the other users devoid of any corresponding XG-enabled UEs to save power, where the XG refers to 5G or 6G radio communication.

At 510, a location of the second user 112B may be detected and tracked concurrently with the first user 112A in the surrounding area of the edge device 104A based on the sensor 222. The control circuitry 214 may be further configured to detect and track the location of the second user 112B concurrently with the first user 112A.

At 512, the control of the first antenna array 210A may be updated such that a second beam of RF signal is directed in the second direction 316B towards the second user 112B to reach the second user 112B concomitant to the first beam of RF signal that is directed in the first direction 316A towards the first user 112A to reach the first user 112A. The control circuitry 214 may be further configured to update the control of the first antenna array 210A.

Various embodiments of the disclosure may provide a non-transitory computer-readable medium having stored thereon computer-implemented instructions that, when executed by a computer, causes a communication apparatus to execute operations that include sensing a surrounding area of the communication apparatus. The operations further comprise detecting a first user (e.g., the first user 112A) in the surrounding area of the communication apparatus. The operations further comprise tracking the detected first user in the surrounding area of the communication apparatus. The operations further comprise controlling the first antenna array 210A to direct a first beam of radio frequency (RF) signal having a signal strength greater than a first threshold in a first direction of the first user being tracked using a sensor at the communication apparatus.

Various embodiments of the disclosure may provide a non-transitory computer-readable medium having stored thereon, computer-implemented instructions that, when executed by a computer, causes the computer to execute operations that include sensing a surrounding area of an edge device (e.g., the edge device 104A) by a sensor (e.g., the sensor 222) of the edge device 104A The operations further comprise detecting a first user (e.g., the first user 112A) in the surrounding area of the edge device sensed by the sensor. The operations further comprise tracking the location of the detected first user in the surrounding area of the edge device based on the sensor. The operations further comprise controlling the first antenna array 210A of the edge device 104A to direct a first beam of radio frequency (RF) signal at the location of the first user being tracked based on the sensor.

While various embodiments described in the present disclosure have been described above, it should be understood that such embodiments have been presented by way of example and not limitation. It is to be understood that various changes in form and detail can be made therein without departing from the scope of the present disclosure. In addition to using hardware (e.g., within or coupled to a central processing unit ("CPU"), microprocessor, microcontroller, digital signal processor, processor core, system on chip ("SOC") or any other device), implementations may also be embodied in software (e.g., computer-readable code, program code, and/or instructions disposed of in any form, such as source, object or machine language) disposed for example in a non-transitory computer-readable medium configured to store the software. Such software can enable, for example, the function, fabrication, modeling, simulation, description, and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known non-transitory computer-readable medium, such as semiconductor, magnetic disc, or optical disc (e.g., CD-ROM, DVD-ROM, etc.). The software can also be disposed of as computer data embodied in a non-transitory computer-readable transmission medium (e.g., solid-state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A first edge device, comprising:
   a first antenna array;
   a sensor configured to sense a surrounding area of the first edge device; and
   control circuitry configured to:
      detect a first user in the surrounding area of the first edge device;
      track the detected first user in the surrounding area of the first edge device;
      control the first antenna array to direct a first beam of radio frequency (RF) signal in a first direction of the tracked first user;
      detect and track a second user concurrently with the first user in the surrounding area of the first edge device; and
      update the control of the first antenna array to direct a second beam of RF signal in a second direction towards the second user concomitant to the directed first beam of RF signal in the first direction towards the first user.

2. The first edge device according to claim 1, wherein each of the first beam of RF signal and the second beam of RF signal has a signal strength greater than a first threshold value.

3. The first edge device according to claim 1, wherein the control circuitry is further configured to periodically update a radiation pattern of the first beam of RF signal based on changes in a location of the first user.

4. The first edge device according to claim 1, wherein the control circuitry is further configured to:
   detect a first moving object within a communication range; and
   activate a sensing function based on the detection of the first moving object within the communication range.

5. The first edge device according to claim 1, wherein the control circuitry is further configured to:
   receive an activation signal from a first user equipment associated with the first user; and
   activate a sensing function based on the activation signal received from the first user equipment associated with the first user.

6. The first edge device according to claim 5, wherein the control circuitry is further configured to:
   track a first moving object in the surrounding area of the first edge device; and
   predict a start time and an end time of a signal blockage for the first user equipment from the first moving object based on the track of the first moving object in the surrounding area of the first edge device,
   wherein:
      the first user equipment is in motion, and
      the first user equipment is under service of the first edge device.

7. The first edge device according to claim 6, wherein the control circuitry is further configured to communicate an alert of the predicted start time and the end time of the signal blockage for the first user equipment to a central cloud server,
   the alert is communicated to cause the central cloud server to instruct a second edge device of a plurality of edge devices with specific initial access information to continue service of the first user equipment, and
   the plurality of edge devices includes the first edge device.

8. The first edge device according to claim 6, wherein the control circuitry is further configured to communicate an alert of the predicted start time and the end time of the signal blockage and specific initial access information to a second edge device of a plurality of edge devices,
   the alert is communicated to cause the second edge device to continue service of the first user equipment, and
   the plurality of edge devices includes the first edge device.

9. The first edge device according to claim 1, wherein the control circuitry is further configured to generate a three-dimensional (3D) environment representation of the surrounding area of the first edge device.

10. The first edge device according to claim 1, wherein the sensor is one of: a sensing Radar, an image sensing device, a combination of the sensing Radar and the image sensing device, or an object detection sensor.

11. The first edge device according to claim 1, wherein the control of the first antenna array to direct the first beam of RF signal comprises selection of a first radiation pattern based on a distance of the first user from the first edge device, and
    the first radiation pattern is associated with a first communication range with respect to the first edge device.

12. The first edge device according to claim 11, wherein the control of the first antenna array to direct the first beam of RF signal comprises execution of beamforming in the selected first radiation pattern to control the directed first beam of RF signal to reach to the first user that is within the first communication range.

13. The first edge device according to claim 12, wherein the control of the first antenna array to direct the first beam of RF signal comprises update of the beamforming to a second radiation pattern from the first radiation pattern to make the directed first beam of RF signal reach to the first user,
    the second radiation pattern is associated with a second communication range with respect to the first edge device, and
    the beamforming is updated to the second radiation pattern, having a signal strength greater than a first threshold, based on a movement of the first user to the second communication range from the first communication range.

14. The first edge device according to claim 1, wherein the control circuitry is further configured to update the control of the first antenna array such that one beam of RF signal in a defined radiation pattern is directed to cover the first user and the second user, and the update of the control of the first antenna array is based on a first location of the first user that is within a threshold range of a second location of the second user.

15. The first edge device according to claim 1, wherein the sensor is further configured to sense the surrounding area of the first edge device in a first frequency different from a second frequency used to direct the first beam of RF signal from the first antenna array.

16. The first edge device according to claim 1, wherein the control circuitry is further configured to determine local traffic information in one of real-time or near real-time based on the sensed surrounding area of the first edge device.

17. The first edge device according to claim 1, wherein
the control circuitry is further configured to communicate an assistance request to a central cloud server in a case where one or more defined service continuity criteria are met,
the assistance request is communicated to cause the central cloud server to instruct the first edge device or a second edge device of a plurality of edge devices with specific initial access information to continue service of one or more user equipment (UEs) carried by the first user, and
the plurality of edge devices includes the first edge device.

18. The first edge device according to claim 1, wherein
the first edge device is at least one of: an XG-enabled repeater device, an XG-enabled small cell, an XG-enabled road-side unit (RSU), and
XG refers to 5G or 6G radio communication.

19. The first edge device according to claim 1, wherein the control circuitry is further configured to:

determine that the detected first user carries an XG-enabled UE; and
distinguish the first user who carries the XG-enabled UE from a plurality of users devoid of any corresponding XG-enabled UEs, wherein
the plurality of users is different from the first user,
the first beam of RF signal is directed at an XG-carrier frequency at a location of the first user such that a direction of a third beam of RF signal is avoided at the XG-carrier frequency to the plurality of users devoid of any corresponding XG-enabled UEs, and
XG refers to 5G or 6G radio communication.

20. A method of radar-assisted beamforming, the method comprising:
sensing, by a sensor of an edge device, a surrounding area of the edge device;
detecting, by control circuitry of the edge device, a first user in the surrounding area of the edge device;
tracking, by the control circuitry, the detected first user in the surrounding area of the edge device;
controlling, by the control circuitry, a antenna array of the edge device to direct a first beam of radio frequency (RF) signal in a direction of the tracked first user;
detecting and tracking, by the control circuitry, a second user concurrently with the first user in the surrounding area of the edge device; and
updating, by the control circuitry, the control of the antenna array to direct a second beam of RF signal in a second direction towards the second user concomitant to the directed first beam of RF signal in the first direction towards the first user.

* * * * *